United States Patent
Nakamura et al.

(10) Patent No.: US 6,265,073 B1
(45) Date of Patent: Jul. 24, 2001

(54) CURABLE COMPOSITION FOR TOP COATING AND ARTICLES COATED USING THE SAME

(75) Inventors: Seigo Nakamura; Masaharu Inoue; Yoshiyuki Kouno; Toshirou Nanbu, all of Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/242,147

(22) PCT Filed: Aug. 21, 1997

(86) PCT No.: PCT/JP97/02905
   § 371 Date: Feb. 9, 1999
   § 102(e) Date: Feb. 9, 1999

(87) PCT Pub. No.: WO98/07797
   PCT Pub. Date: Feb. 26, 1998

(30) Foreign Application Priority Data

| Aug. 22, 1996 | (JP) | 8-221052 |
| Aug. 22, 1996 | (JP) | 8-221053 |
| Sep. 12, 1996 | (JP) | 8-241658 |

(51) Int. Cl.$^7$ .................................... B32B 27/38
(52) U.S. Cl. .................. 428/413; 428/418; 428/446; 428/447; 428/450
(58) Field of Search ............... 428/413, 414, 428/416, 418, 446, 447, 450

(56) References Cited

U.S. PATENT DOCUMENTS

| 4,681,811 | 7/1987 | Simpson et al. | 428/413 |
| 5,196,485 | 3/1993 | McMonigal et al. | 525/327.3 |
| 5,609,918 * | 3/1997 | Yamaguchi et al. | 427/407.1 |

FOREIGN PATENT DOCUMENTS

WO 96/23033   8/1996   (WO).

* cited by examiner

Primary Examiner—D. S. Nakarani
Assistant Examiner—Monique R. Jackson
(74) Attorney, Agent, or Firm—Jordan and Hamburg LLP

(57) ABSTRACT

The curable composition for coating of the invention comprises (A) 100 parts by weight of an epoxy group-having resin, (B) from 0.001 to 100 parts by weight of a carboxyl group-having compound or resin, and (C) from 1.0 to 100 parts by weight of a silicon compound of the following general formula (I) and/or its partially-hydrolyzed condensate:

$$(R^1O)_{4-a}SiR^2_a \qquad (I)$$

wherein $R^1$ represents a hydrogen atom, an alkyl group having from 1 to 10 carbon atoms, an aryl group having from 6 to 10 carbon atoms, or an aralkyl group having from 7 to 10 carbon atoms; $R^2$ represents an alkyl group having from 1 to 10 carbon atoms, an aryl group having from 6 to 10 carbon atoms, an aralkyl group having from 7 to 10 carbon atoms, or an alkoxy group having from 1 to 10 carbon atoms; and a represents an integer of from 0 to 2. The composition has good thermal curability, and the coating films from the composition have excellent and well-balanced physical properties including excellent acid resistance, scratch resistance, weather resistance, appearance and recoating adhesiveness, and additionally have extremely excellent stain resistance.

12 Claims, No Drawings

CURABLE COMPOSITION FOR TOP COATING AND ARTICLES COATED USING THE SAME

TECHNICAL FIELD

The present invention relates to a curable composition for top coating favorable for cars, industrial machines, steel furniture, interior and exterior decorations for constructions, household electric appliances, plastic goods, etc., and to articles coated with the composition. More precisely, the invention relates to a curable composition for top coating, which forms coating films having high acid resistance and scratch resistance, good outward appearance, and extremely excellent stain resistance and which has good thermal curability, and also to articles coated with it. The composition is especially favorable to top coating for cars.

BACKGROUND ART

For coating cars, industrial machines, steel furniture, interior and exterior decorations for constructions, household electric appliances, plastic goods and others, coating compositions consisting essentially of melamine resins such as alkydmelamines, acrylic melamines and the like have heretofore been used.

However, the coating compositions consisting essentially of such melamine resins are problematic in that they generate harmful formalin when cured. In addition, it is a more serious problem that the cured films produced by such melamine resins have poor acid resistance. These melamine resins are therefore often corroded, or etched, whitened or stained, by the acid rain caused by recent air pollution.

In order to solve this problem, coating compositions not containing melamine resins have been proposed (Japanese Patent Application Laid-Open (JP-A) Hei-3-287650 and Hei-2-45577). In those coating compositions, formed are ester bonds that act as crosslinking points, through reaction of an acid group with an epoxy group. Therefore, as compared with coating compositions consisting essentially of melamine resins, those not containing melamine resins have the advantage of forming coating films with good acid resistance and weather resistance.

Apart from the above, other studies have been made for using blends of hydrolyzable silyl group-having vinylic copolymers and acrylic polyols, or copolymers of hydrolyzable silyl group-having vinyl monomers and alcoholic hydroxyl group-having vinylic monomers in coating compositions (see JP-A Sho-63-132977).

The coating compositions comprising blends of hydrolyzable silyl group-having vinylic copolymers and acrylic polyols, or copolymers of hydrolyzable silyl group-having vinyl monomers and alcoholic hydroxyl group-having vinylic monomers are characterized in that they cure through stable siloxane or siloxy bonding to be formed by the reaction of the hydrolyzable silyl group and the alcoholic hydroxyl group, and, therefore, as compared with coating compositions consisting essentially of melamine resins such as acrylic melamines, alkydmelamines and the like, they form coating films having better acid resistance and weather resistance.

Generally, any of two types of metallic color finishing and solid color finishing are employed for finishing car bodies by top coating.

For the metallic color finishing 2-coat 1-bake method of heating and curing a coating composition, is generally employed coating a substrate with a metallic base coat followed by overcoating it with a clear coat of an acrylic melamine resin composition in an wet-on-wet system.

For the other solid color finishing, generally employed is a 1-coat 1-bake method of using an alkydmelamine resin composition, in which the composition is heated and cured to form top coating. For recent severe requirements for the properties of coating films, including, for example, finish appearance, weather resistance, acid resistance, scratch resistance and stain resistance thereof, a method of overcoating a solid color-finished substrate with a clear coat of an acrylic melamine resin composition or the like has been proposed.

The present invention has been made in consideration of the current situation noted above, and its object is to provide a curable composition for top coating, which has good thermal curability to form good coating films having well-balanced physical properties including good acid resistance, scratch resistance, weather resistance, outward appearance and recoating adhesiveness, and additionally having extremely excellent stain resistance, and also to provide articles coated with the composition.

DISCLOSURE OF THE INVENTION

The curable composition for top coating of the invention, which solves the problems noted above, comprises;
(A) 100 parts by weight of an epoxy group-having resin,
(B) from 0.001 to 100 parts by weight of a carboxyl group-having compound or resin, and
(C) from 1.0 to 100 parts by weight of a silicon compound of the following general formula (I) and/or its partially-hydrolyzed condensate:

$$(R^1O)_{4-a}SiR^2_a \qquad (I)$$

wherein $R^1$ represents a hydrogen atom, an alkyl group having from 1 to 10 carbon atoms, an aryl group having from 6 to 10 carbon atoms, or an aralkyl group having from 7 to 10 carbon atoms; $R^2$ represents an alkyl group having from 1 to 10 carbon atoms, an aryl group having from 6 to 10 carbon atoms, an aralkyl group having from 7 to 10 carbon atoms, or an alkoxy group having from 1 to 10 carbon atoms; a represents an integer of from 0 to 2; and plural $R^1$'s may be the same or different, and plural $R^2$'s, if any, may also be the same or different.

In the curable composition for top coating noted above, it is desirable that the resin of the component (A) has at least 2 epoxy groups in one molecule and has an epoxy equivalent of from 240 to 2,000 g/mol.

In the curable composition for top coating noted above, it is also desirable that the component (A) is a vinylic copolymer, of which the main chain is substantially a vinylic copolymer chain, and which has at least 2 epoxy groups in one molecule and has at least one hydrolyzable silyl group of the following general formula (II) as bonded to the carbon atom at the main chain terminals and/or in the side chains in the molecule, and which has an epoxy equivalent of from 240 to 2,000 g/mol and a hydrolyzable silyl equivalent of from 500 to 7,000 g/mol:

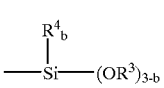

(II)

wherein $R^3$ represents a hydrogen atom, or an alkyl group having from 1 to 10 carbon atoms; $R^4$ represents a hydrogen atom, or a monovalent hydrocarbon residue selected from an alkyl group having from 1 to 10 carbon atoms, an aryl group having from 6 to 10 carbon atoms and an aralkyl group having from 7 to IO carbon atoms; b represents an integer of from 0 to 2; and plural $R^3$'s may be the same or different, and plural $R^4$'s, if any, may also be the same or different.

In the curable composition for top coating noted above, it is more desirable that the component (A) additionally has at least one alcoholic hydroxyl group at the main chain terminals and/or in the side chains, and has an alcoholic hydroxyl equivalent of from 500 to 3,000 g/mol.

In the curable composition for top coating noted above, the component (A) may additionally have a monovalent organic group of a polyoxyalkylene group of the following general formula (III):

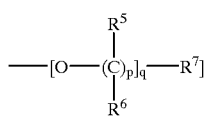

(III)

wherein $R^5$ and $R^6$ may be the same or different, and each represents a hydrogen atom or an alkoxy group having from 1 to 4; $R^7$ represents a hydrogen atom, or an alkoxy group having from 1 to 4; p represents an integer of from 2 to 4; and q represents an integer of from 1 to 200.

In the curable composition for top coating noted above, it is desirable that the component (B) is an oligomer compound having a molecular weight of not larger than 2,000, which is prepared through half-esterification of a polyol compound and an acid anhydride, and has at least 2 carboxyl groups in one molecule.

It is also desirable that the molar ratio of the epoxy groups in the component (A) to the carboxyl groups in the component (B) falls between 0.2/1 and 3.0/1 in terms of epoxy groups/carboxyl groups.

It is also desirable that the component (C) is a partially-hydrolyzed condensate of tetraalkyl silicates.

It is more desirable that the component (C) is a partially-hydrolyzed condensate of tetramethyl silicate and/or tetraethyl silicate, and has a weight-average molecular weight of not smaller than 1,000.

Preferably, the curable composition of the invention may contain (D) a hydroxyl group-having resin with no hydrolyzable silyl group, in an amount of from 0 to 80 parts by weight relative to 100 parts by weight of the total solid content of the components (A), (B) and (C).

The component (D) is preferably a copolymer of a hydroxyl group-having vinylic monomer and any other vinylic monomers.

Also preferably, the component (D) is a non-aqueous dispersed polymer, which is composed of from 5 to 30 parts by weight of at least one, hydroxyl group-having vinylic monomer and from 70 to 95 parts by weight of at least one vinylic monomer having no hydroxyl group, and which is prepared through dispersion polymerization of at least one, hydroxyl group-having vinylic monomer and at least one vinylic monomer having no hydroxyl group in an organic solution that contains an organic solvent-soluble polymer having a number-average molecular weight of from 1,000 to 25,000. The non-aqueous dispersed polymer of (D) is insoluble in the organic solution.

The resin composition of the invention may further contain (E) an amino resin in an amount of not larger than 30 parts by weight relative to 100 parts by weight of the total solid content of the components (A), (B) and (C).

The coated article of the invention has a clear top coat as formed over the surface of the substrate previously coated with a coating composition that contains metallic powder and/or color pigment, in which the clear top coat consists essentially of the curable composition for top coating of the invention noted above.

BEST MODES OF CARRYING OUT THE INVENTION

The constituent components and others that may constitute the curable composition for top coating of the invention are described below in order. Unless otherwise specifically indicated, "%" and "parts" in the following description are all by weight.

Component (A)

The epoxy group-having resin (A) comprises units derived from epoxy group-having vinylic monomers and units derived from other copolymerizable vinylic monomers.

The epoxy group-having vinylic monomers are not specifically defined, for example, including those of the following general formulae (1) to (14):

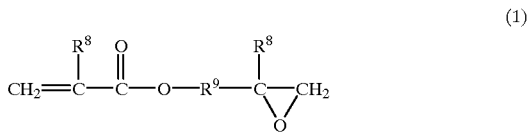

(1)

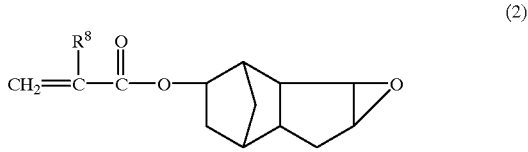

(2)

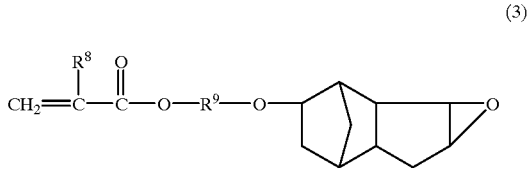

(3)

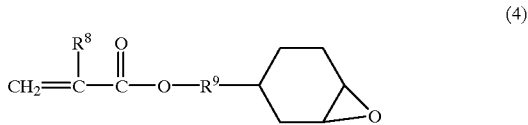

(4)

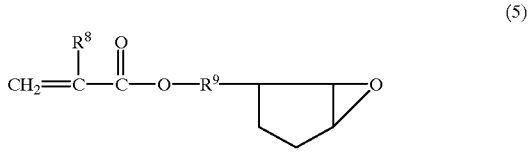

(5)

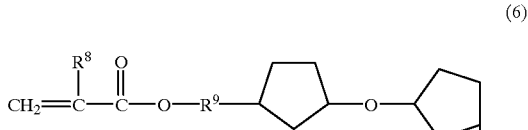

(6)

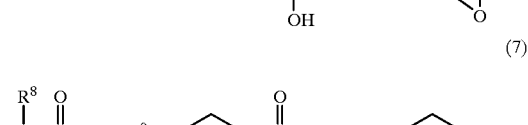

(7)

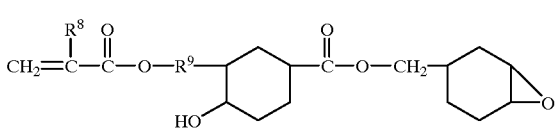

-continued

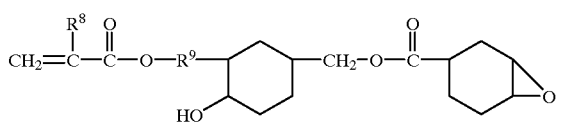
(8)

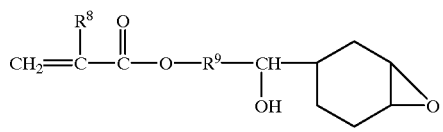
(9)

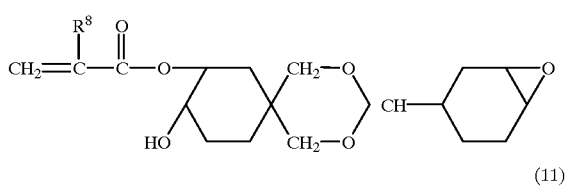
(10)

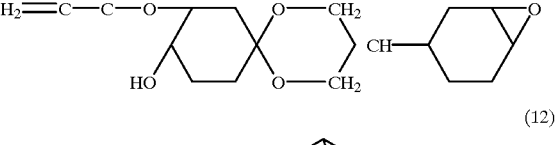
(11)

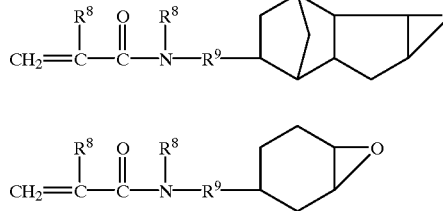
(12)

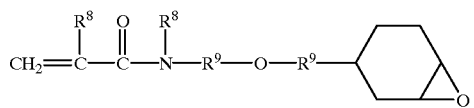
(13)

(14)

In those general formulae, $R^8$ represents a hydrogen atom or a methyl group, and $R^9$ represents a divalent aliphatic hydrocarbon residue having from 1 to 6 carbon atoms.

The amount of the epoxy group-having vinylic monomers to be in the resin (A) is preferably from 10 to 70%, more preferably from 20 to 60% of the total amount of the comonomers therein. If the amount of those monomers is smaller than 10%, the composition to be obtained herein could not have good curability and acid resistance. However, if the amount is larger than 70, the compatibility of resin (A) with other resins will be poor, and the weather resistance of the cured product of the composition will be poor.

The other copolymerizable vinylic monomers are not also specifically defined, for example, including the following:

Methyl (meth)acrylate, ethyl (meth)acrylate, butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl (meth)acrylate, isobornyl (meth)acrylate, stearyl (meth)acrylate, benzyl (meth)acrylate, trifluoroethyl (meth)acrylate, pentafluoropropyl (meth)acrylate, as well as unsaturated polycarboxylates such as diesters or half-esters of unsaturated polycarboxylic acids (maleic acid, fumaric acid, itaconic acid, etc.) with linear or branched alcohols having from 1 to 20 carbon atoms;

Aromatic hydrocarbon-based vinyl compounds such as styrene, a-methylstyrene, chlorostyrene, sodium styrenesulfonate, etc.;

Vinyl esters and allyl compounds such as vinyl acetate, vinyl propionate, diallyl phthalate, etc.;

Nitrile group-having vinyl compounds such as (meth)acrylonitrile, etc.; silane compounds such as γ-(meth)acryloxypropyltrimethoxysilane, γ-(meth)acryloxypropyltriethoxysilane, γ-(meth)acryloxypropyltrisilanol, γ-(meth)acryloxypropylmethyldimethoxysilane, vinyltrimethoxysilane, vinyltriethoxysilane, 2-styrylethyltrimethoxysilane, allyltriethoxysilane, etc.;

Basic nitrogen atom-containing vinyl compounds such as dimethylaminoethyl (meth)acrylate, diethylaminoethyl (meth)acrylate, vinylpyridine, aminoethyl vinyl ether, etc.;

Amido group-having vinyl compounds such as (meth)acrylamide, itaconic acid diamide, α-ethyl(meth)acrylamide, crotonamide, maleic acid diamide, fumaric acid diamide, N-vinylpyrrolidone, N-butoxymethyl(meth)acrylamide, N,N-dimethylacrylamide, N-methylacrylamide, N,N-dimethylacrylamide, N-methylacrylamide, acryloylmorpholine, etc.;

Other vinyl compounds such as vinyl methyl ether, vinyl chloride, vinylidene chloride, chloroprene, propylene, butadiene, isoprene, maleimide, N-vinylimidazole, etc.

For producing the resin (A), preferred is a solution polymerization method using a peroxide-type radical initiator such as t-butyl peroxyacetate or the like, or using an azo-type radical initiator such as azobisisobutyronitrile or the like, since the resin (A) is produced easily in the method.

If desired, in the method, a chain transfer agent may be used for controlling the molecular weight of the polymers produced. The chain transfer agent includes, for example, n-dodecylmercaptan, t-dodecylmercaptan, n-butylmercaptan, y-mercaptopropyltrimethoxysilane, γ-mercaptopropyltriethoxysilane, γ-mercaptopropylmethyldimethoxysilane, γ-mercaptopropylmethyldiethoxysilane, etc.

The polymerization solvent to be used in the solution polymerization is not specifically defined, so far as it is inactive to the polymerization. For example, employable are inactive solvents such as hydrocarbons (toluene, xylene, n-hexane, cyclohexane, etc.), acetates (ethyl acetate, butyl acetate, etc.), alcohols (methanol, ethanol, isopropanol, n-butyl alcohol, etc.), ethers (ethyl cellosolve, butyl cellosolve, cellosolve acetate, etc.), ketones (methyl ethyl ketone, ethyl acetacetate, acetylacetone, diacetonealcohol, methyl isobutyl ketone, acetone, etc.).

The number-average molecular weight of the resin (A) is preferably from 2,000 to 20,000, more preferably from 2,500 to 15,000, in view of the expected physical properties, such as durability and others, of the cured films to be formed from the curable composition of the invention.

Desirably, the resin (A) has at least 2 epoxy groups in one molecule, and has an epoxy equivalent of from 240 to 2,000 g/mol, preferably from 250 to 1,000 g/mol, more preferably from 250 to 750 g/mol, in view of the curability of the composition and of the weather resistance as well as the final appearance of the cured films of the composition. If the epoxy equivalent of the resin (A) is smaller than 240 g/mol, the compatibility of the resin (A) with the components (B) and (C) will be poor. If, however, the epoxy equivalent is larger than 2,000 g/mol, the thermal curability of the composition will be poor and, in addition, the scratch resistance and the final appearance of the coating films from the composition will also be poor.

Also desirably, the resin (A) has, inonemolecule, at least one hydrolyzable silyl group of the following general formula (II) as bonded to the carbon atom at the terminals of the main chain and/or in the side chains:

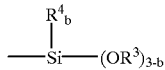
(II)

The hydrolyzable silyl equivalent of the resin (A) may be from 500 to 7,000 g/mol, preferably from 550 to 5,000 g/mol, more preferably from 650 to 4,000 g/mol. If the hydrolyzable silyl equivalent of the resin (A) is smaller than 500 glmol, the inner stress of the coating films from the composition will be large. However, if larger than 7,000 g/mol, the curability of the composition will be lowered.

To introduce the hydrolyzable silyl groups into the resin (A), for example, hydrolyzable silyl group-having vinyl monomers (a-1) may be copolymerized with the polymer of the resin (A). The hydrolyzable silyl group-having vinyl monomers include, for example, the following:

Compounds of a general formula (IV):

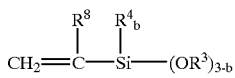
(IV)

wherein $R^3$, $R^4$, $R^8$ and b have the same meanings as above, for example, the following:

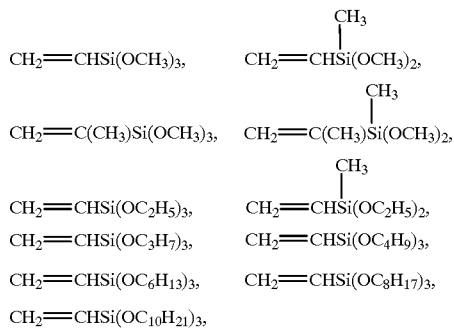

Compounds of a general formula (V):

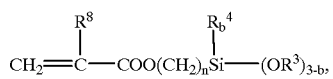
(V)

wherein $R^3$, $R^4$, $R^8$ and b have the same meanings as above, and n represents an integer of from 1 to 12, for example, the following:

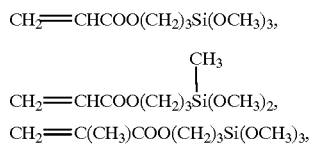

-continued

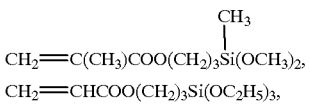

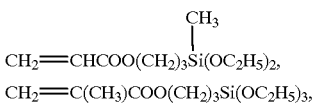

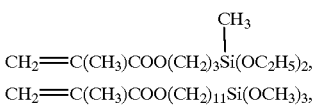

Compounds of a general formula (VI):

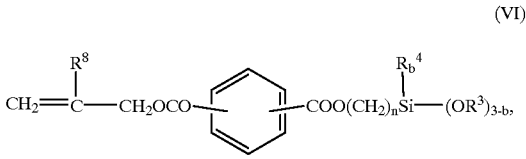
(VI)

wherein $R^3$, $R^4$, $R^8$, b and n have the same meanings as above, for example, the following:

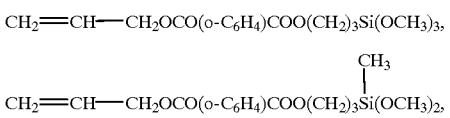

Compounds of a general formula (VII):

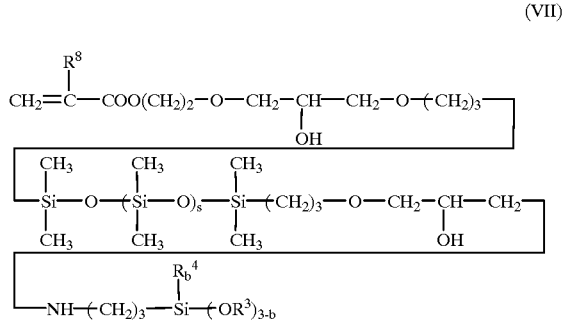
(VII)

wherein $R^3$, $R^4$, $R^8$ and b have the same meanings as above, and s represents an integer of from 0 to 22, for example, the following:

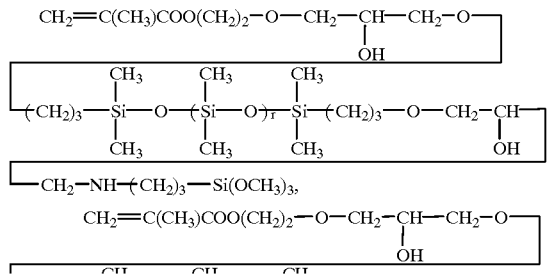

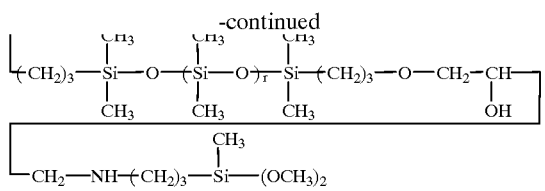

wherein r represents an integer of from 0 to 20.

They further include (meth)acrylates having the hydrolyzable silyl group of formula (II) as bonded to the terminal via urethane bonding or siloxane bonding. These monomers may be used either singly or as combined. Of those, preferred are compounds of formula (V), as they are easy to handle and are inexpensive and they do not give any side products in polymerization.

The amount of the hydrolyzable silyl group-having vinylic monomers (a-1) to be used in producing the resin (A) is preferably from 5 to 60% (by weight—the same shall apply hereunder), more preferably from 10 to 50% of the total amount of the comonomers for the resin (A). If the amount of the hydrolyzable silyl group-having monomers (a-1) used is smaller than 5%, the coating films from the curable composition obtained will have poor acid resistance. However, if the amount is larger than 60%, the storage stability of the curable composition will be poor.

Further preferably, the resin (A) additionally has at least one alcoholic hydroxyl group at the main chain terminals and/or in the side chains. The hydroxyl equivalent of the resin (A) may be from 500 to 3,000 g/mol, preferably from 500 to 2,000 g/mol, more preferably from 500 to 1,500 g/mol. If the hydroxyl equivalent is smaller than 500 g/mol, the waterproofness and the acid resistance of the coating films from the curable composition will be poor. If, however, larger than 3,000 g/mol, the thermal curability of the composition will be poor.

To introduce the alcoholic hydroxyl groups into the resin (A), for example, hydroxyl group-having vinyl monomers (a-2) may be copolymerized with the polymer of the resin (A). The hydroxyl group-having vinyl monomers (a-2) include, for example, the following:

2-Hydroxyethyl (meth)acrylate, 2-hydroxypropyl (meth)acrylate, 2-hydroxybutyl (meth)acrylate, 4-hydroxybutyl (meth)acrylate, 2-hydroxyethyl vinyl ether, N-methylol (meth)acrylamide, Toa Synthetic Chemical's Aronics 5700, Nippon Shokubai Kagaku's HE-10, HE-20, HP-1 and HP-20 (these are all hydroxyl-terminated acrylate oligomers), as well as Blemmer GLM (glycerol monomethacrylate), ε-caprolactone-modified, copolymerizable hydroxyalkylvinylic compounds as obtained through reaction of hydroxyl group-having vinylic compounds and ε-caprolactone, etc.

As specific examples of the ε-caprolactone-modified, copolymerizable hydroxyalkylvinylic compounds, mentioned are compounds of a general formula (VIII):

(VIII)

Examples of the compounds include Placcel FA-1 ($R^8$ is hydrogen, and t is 1); Placcel FA-4 ($R^8$ is hydrogen, and t is 1), Placcel FM-1 ($R^8$ is hydrogen, and t is 1), Placcel FM-4 ($R^8$ is hydrogen, and t is 4) (these are all products of Daisel Chemical Industry), and also TONE M-100 ($R^8$ is hydrogen, and t is 2), TONE M-201 ($R^8$ is methyl, and t is 1) (these are both products of UCC).

These monomers (a-2) may be used either singly or as combined.

Of the monomers (a-2) mentioned above, preferred are 2-hydroxypropyl (meth)acrylate, 2-hydroxyethyl (meth)acrylate, and ε-caprolactone-modified, copolymerizable hydroxyalkylvinylic compounds, from the viewpoint that the acid resistance and the waterproofness of the coating films from the curable composition are good. Especially preferred is 2-hydroxypropyl (meth)acrylate.

The amount of the hydroxyl group-having vinyl monomers (a-2) to be used in producing the resin (A) is preferably from 5 to 50%, more preferably from 7 to 40% of the total amount of the comonomers for the resin (A). If the amount of the monomers (a-2) used is smaller than 5%, the resulting composition could not have good curability. However, if it is larger than 50%, the waterproofness and the acid resistance of the coating films from the composition will be poor.

In the resin (A), the molar ratio of alcoholic hydroxyl groups to hydrolyzable silyl groups (alcoholic hydroxyl groups/hydrolyzable silyl groups) preferably falls between 0 and 10, more preferably between 0.1 and 7.5, even more preferably between 0.2 and 4, from the viewpoint that the curable composition to be obtained has good thermal curability and that the coating films from the composition have good acid resistance, good weather resistance and good waterproofness.

In order to make the resin (A) have the molar ratio falling within the defined range, for example, the amount of the hydrolyzable silyl group-having vinylic monomers and that of the alcoholic hydroxyl group-having vinylic monomers to be used in producing the resin (A) may be suitably controlled.

Where the resin (A) additionally has monovalent organic groups of polyoxyalkylenes of the following general formula (III), the composition of the invention could be hydrophilic and the stain resistance of the coating films from the composition could be improved more.

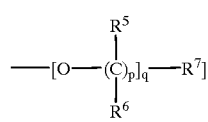

(III)

wherein $R^5$ and $R^6$ may be the same or different, and each represents a hydrogen atom or an alkoxy group having from 1 to 4 carbon atoms; $R^7$ represents a hydrogen atom, or an alkoxy group having from 1 to 4 carbon atoms; p represents an integer of from 2 to 4; and q represents an integer of from 1 to 200.

The polyoxyalkylene group-having compounds include, for example, (meth)acrylates such as polypropylene glycol methacrylate, polyethylene glycol monomethacrylate, polyethylene glycol-polypropylene glycol methacrylate, polypropylene glycol monoacrylate, polyethylene glycol monoacrylate, polypropylene glycol-polytrimethylene monoacrylate, polyethylene glycol-polytetramethylene glycol monomethacrylate, methoxypolyethylene glycol methacrylate, perfluoroalkylethyl-polyoxyalkylene methacrylates, etc.; allyl compounds such as polyethylene glycol monoallyl ether, polypropylene glycol monoallyl ether, etc. Commercial products of those compounds are available, including, for example, Blemmer PP series (polypropylene glycol methacrylates), Blemmer PE series (polyethylene glycol monomethacrylates), Blemmer PEP series (polyethylene glycol-polypropylene glycol methacrylates), Blemmer AP-400 (polypropylene glycol monoacrylate), Blemmer AE-350 (polyethylene glycol monoacrylate), Blemmer NKH-5050 (polypropylene glycol-polytrimethylene monoacrylate), and Blemmer GLM (glycerol monomethacrylate). These are all products of Nippon Oils & Fats Co.

These polyoxyalkylene group-having compounds may be used either singly or as combined.

Where the polyoxyalkylene group-having compounds are used, their amount may be preferably at most 40%, more preferably at most 30%, of the total amount of the comonomers used. If their amount is larger than 40%, the waterproofness and the weather resistance of the coating films from the composition will be poor.

Component (B)

The component (B) is a compound or resin having carboxyl groups, and is preferably an oligomer compound having a molecular weight of not larger than 2,000, which is obtained through half-esterification of a polyol compound and an acid anhydride to have at least 2 carboxyl groups in one molecule (this is hereinafter referred to as "carboxylic acid oligomer"), in view of the weather resistance, the acid resistance and the recoating adhesiveness of the coating films from the resin composition. For this, the polyol compound shall have at least 2 hydroxyl groups, preferably from 2 to 10 hydroxyl groups, in one molecule.

The polyols having at least 2 hydroxyl groups in one molecule, which are for producing the carboxylic acid oligomers for use in the invention, include, for example, polyalcohols such as ethylene glycol, 1,2- and 1,3-propylene glycols, 1,3-butane-diol, 1,4-butane-diol, 2,3-butane-diol, 1,6-hexane-diol, diethylene glycol, pentane-diol, dimethylbutane-diol, hydrogenated bisphenol A, glycerin, sorbitol, neopentyl glycol, 1,3-octane-diol, 1,4-cyclohexane-dimethanol, 2-methyl-1,3-propane-diol, 1,2,6-hexane-triol, 1,2,4-butane-triol, trimethylolethane, trimethylolpropane, pentaerythritol, quinitol, mannitol, trishydroxyethyl isocyanurate, dipentaerythritol, trishydroxymethylethane, etc.; ring-cleaved adducts of lactone compounds, such as γ-butyrolactone, ε-caprolactone or the like, to those polyalcohols; alcohol-rich adducts of isocyanate compounds, such as tolylene diisocyanate, diphenylmethane diisocyanate, hexamethylene diisocyanate, isophorone diisocyanate or the like, to those polyalcohols; alcohol-rich adducts of vinyl ether compounds, such as ethylene glycol divinyl ether, polyethylene glycol divinyl ether, butane-diol divinyl ether, pentane-diol divinyl ether, hexane-diol divinyl ether, 1,4-cyclohexane-dimethanol divinyl ether, to those polyalcohols; alcohol-rich condensates of those polyalcohols with alkoxysilicone compounds, such as KR-213, KR-217, KR-9218 (all trade names of products of Shin-etsu Chemical Industry), etc.

As preferred acid anhydrides to be reacted with those polyols, for example, mentioned are hexahydrophthalic anhydride, phthalic anhydride, methylhexahydrophthalic anhydride, tetrahydrophthalic anhydride, trimellitic anhydride, etc.

The molecular weight of the component (B) may be at most 2,000. If its molecular weight is larger than 2,000, the component (B) is problematic in that the curability of the composition will be poor. The preferred range of the molecular weight falls between 100 and 1,800.

The amount of the component (B) to be in the composition is from 0.001 to 100 parts, preferably from 0.1 to 90 parts, more preferably from 1.0 to 80 parts, relative to 100 parts of the component (A). If the amount of the component (B) is smaller than 0.001 parts, there may occur a problem that the curability of the composition will be poor. If, however, the amount is larger than 100 parts by weight, the waterproofness and the weather resistance of the coating films from the composition will be poor.

The molar ratio of the epoxy groups in the vinylic copolymer (A) to the carboxyl groups in the component (B) is preferably such that the molar number of the epoxy groups relative to one mol of the carboxyl groups (epoxy groups /carboxyl groups) falls between 0.2 and 3.0, more preferably between 0.5 and 2.5, even more preferably between 0.6 and 2.0, in order that the curable composition could have good curability and that the coating films from the composition could have good acid resistance, good weather resistance and good waterproofness.

Component (C)

The component (C) is a silicon compound of the following general formula (I) and/or its partially-hydrolyzed condensate, and this acts to improve the stain resistance of the coating films from the curable composition.

$$(R^1O)_{4-a}SiR^2_a \qquad (I)$$

wherein $R^1$ represents a hydrogen atom, an alkyl group having from 1 to 10 carbon atoms, preferably having from 1 to 4 carbon atoms, an aryl group having from 6 to 10 carbon atoms, or an aralkyl group having from 7 to 10 carbon atoms; $R^2$ represents an alkyl group having from 1 to 10 carbon atoms, an aryl group having from 6 to 10 carbon atoms, an aralkyl group having from 7 to 10 carbon atoms, or an alkoxy group having from 1 to 10 carbon atoms; a represents an integer of from 0 to 2; and plural $R^1$'s may be the same or different, and plural $R^2$'s, if any, may also be the same or different.

Specific examples of the silicon compounds include tetraalkyl silicates such as tetramethyl silicate, tetraethyl silicate, tetra-n-propyl silicate, tetra-i-propyl silicate, tetra-n-butyl silicate, tetra-i-butyl silicate, tetra-t-butyl silicate, etc.; as well as trialkoxysilanes and triaryloxysilanes, for example, alkyltrialkoxysilanes such as methyltrimethoxysilane, methyltriethoxysilane, octadecyltriethoxysilane, methyl-tri-sec-octyloxysilane, methyltriisopropoxysilane, methyltributoxysilane, etc.; aryltrialkoxysilanes such as phenyltrimethoxysilane, phenyltriethoxysilane, etc.; alkyltriaryloxysilanes such as methyltriphenoxysilane, etc.; glycidoxytrialkoxysilanes such as 3-glycidoxypropyltrimethoxysilane, etc.

The partially-hydrolyzed condensates of the silicon compounds noted above may be those to be prepared in a conventional way by adding water to tetraalkyl silicates, trialkoxysilanes or triaryloxysilanes such as those mentioned above to thereby partially hydrolyze the silicon compounds, followed by condensing the resulting partial hydrolysates; or those to be prepared by hydrolyzing tetraalkyl silicates such as those mentioned above in an alcoholic solvent in the presence of an acidic substance and water.

As their specific examples, mentioned are partially-hydrolyzed condensates of tetraalkyl silicates, such as MSi51, ESi40, HAS-1, HAS-10 (these are all products of Colcoat), and MS51, MS56, MS56S (these are all products of Mitsubishi Chemical), as well as partially-hydrolyzed condensates of trialkoxysilanes such as AFP-1 (this is a product of Shin-etsu Chemical Industry), etc.

The compounds for the component (C) noted above may be used either singly or as combined. Of those, preferred are partially-hydrolyzed condensates of tetramethyl silicate and/or tetraethyl silicate, such as ESi28, MS51, MS56, HAS-1 and the like, for the reasons that their compatibility with the components (A) and (B) is good, that the curability of the composition comprising any of these is good and that the hardness of the coating films from the composition is high, whereby staining substances are prevented from being fixed on the coating films.

In particular, especially preferred are MS56 and MS56S (both are products of Mitsui Chemical) having a weight-average molecular weight of not lower than 1,000, since the coating films of the composition comprising any of these are hydrophilicated and their stain resistance is improved.

Component (D)

The component (D) is a hydroxyl group-having resin with no hydrolyzable silyl group. This is not limited to only vinylic copolymers, but is preferably a hydroxyl group-having copolymer of vinylic monomers (this is hereinafter referred to as "acrylic polyol") in view of the durability of the coating films from the composition.

The acrylic polyol may be prepared, for example, by copolymerizing hydroxyl group-having vinyl monomers with any other copolymerizable vinylic monomers.

The hydroxyl group-having vinyl monomers as comonomers are not specifically defined, including, for example, 2-hydroxyethyl (meth)acrylate, 2-hydroxypropyl (meth)acrylate, 2-hydroxybutyl (meth)acrylate, 4-hydroxybutyl (meth)acrylate, 2-hydroxyethyl vinyl ether, N-methylol (meth)acrylamide, 4-hydroxystyrene-vinyltoluene, Toa Synthetic Chemical's Aronics 5700, 4-hydroxystyrene, Nippon Shokubai Kagaku's HE-10, HE-20, HP-1 and HP-20 (these are all hydroxyl-terminated acrylate oligomers), Nippon Oils & Fats' Blemmer PP series (polypropylene glycol methacrylates), Blemmer PE series (polyethylene glycol monomethacrylates), Blemmer PEP series (polyethylene glycol-polypropylene glycol methacrylates), Blemmer AP-400 (polypropylene glycol monoacrylate), Blemmer AE-350 (polyethylene glycol monoacrylate), Blemmer NKH-5050 (polypropylene glycol-polytrimethylene monoacrylate), and Blemmer GLM (glycerol monomethacrylate), as well as ε-caprolactone-modified, copolymerizable hydroxyalkylvinylic compounds as obtained through reaction of hydroxyl group-having vinylic compounds and c-caprolactone, etc.

These hydroxyl group-having vinyl monomers may be used either singly or as combined.

The other vinylic monomers copolymerizable with those hydroxyl group-having vinyl monomers are not specifically defined, and their examples include methyl (meth)acrylate, ethyl (meth)acrylate, butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl (meth)acrylate, isobornyl (meth)acrylate, stearyl (meth)acrylate, benzyl (meth)acrylate, cyclohexyl (meth)acrylate, trifluoroethyl (meth)acrylate, pentafluoropropyl (meth)acrylate, as well as unsaturated polycarboxylates such as diesters or half-esters of unsaturated polycarboxylic acids (maleic acid, fumaric acid, itaconic acid, etc.) with linear or branched alcohols having from 1 to 20 carbon atoms; aromatic hydrocarbon-based vinyl compounds such as styrene, α-methylstyrene, chlorostyrene, sodium styrenesulfonate, etc.; vinyl esters and allyl compounds such as vinyl acetate, vinyl propionate, diallyl phthalate, etc.; nitrile group-having vinyl compounds such as (meth)acrylonitrile, etc.; epoxy group-having vinyl compounds such as glycidyl (meth)acrylate, etc.; basic nitrogen atom-containing vinyl compounds such as dimethylaminoethyl (meth)acrylate, diethylaminoethyl (meth)acrylate, vinylpyridine, aminoethyl vinyl ether, etc.; amido group-having vinyl compounds such as (meth)acrylamide, itaconic acid diamide, α-ethyl(meth)acrylamide, crotonamide, maleic acid diamide, fumaric acid diamide, N-vinylpyrrolidone, N-butoxymethyl(meth)acrylamide, N,N-dimethylacrylamide, N-methylacrylamide, acryloylmorpholine, etc.

One or more of those vinylic monomers copolymerizable with the hydroxyl group-having vinylic monomers may be used either singly or as combined.

The acrylic polyol may have segments comprising urethane bonding or siloxane bonding, in its main chain in an amount of smaller than 50%.

The acrylic polyol is preferably prepared in solution polymerization using a radical initiator. In the solution polymerization, optionally used is a chain transfer agent such as n-dodecylmercaptan by which the molecular weight of the polymer formed could be controlled.

As the polymerization solvent, usable is a non-reactive solvent, by which, however, the present invention is not restricted.

One or more acrylic polyols may be used either singly or as combined.

The acrylic polyol is preferably a non-aqueous dispersed polymer, in view of the breaking stress and elongation of the coating films from the composition and of the easiness in controlling the rheology of the composition.

The non-aqueous dispersed polymer is meant to indicate a polymer as stably dispersed in an organic medium, as so written in literatures such as "Dispersion Polymerization in Organic Media" by K. E. J. Barrett (John Wiley& Sons, London, 1975). The polymer is composed of (1) a core site and (2) an arm site, in which the both sites are bonded to each other via covalent bonding, for example, through reaction of the carboxylic acid group and the epoxy group therein.

The core site (1) is of a macromolecular polymer having a number-average molecular weight of from 15,000 to 300,000 and dispersed in an organic medium; while the arm site (2) is of a macromer chain bonded to the core site (1). The arm site (2) is soluble in an organic medium by itself, but forms a three-dimensional barrier as bonded to the core site (1), and acts as a stabilizer.

The core site (1) is of a copolymer of vinylic monomers. The monomers are not specifically defined, and their examples include acrylic acid, methacrylic acid, and their alkyl esters, hydroxyalkyl esters, allyl esters and glycidyl esters, as well as styrene, acrylonitrile, etc.

The organic solvent-soluble polymer for the arm site may comprise from 5 to 30 parts, preferably from 5 to 25 parts of at least one, hydroxyl group-having vinylic monomer, and from 70 to 95 parts, preferably from 75 to 95 parts of at least one other vinylic monomer not having a hydroxyl group. If the amount of the hydroxyl group-having vinylic monomer is smaller than 5 parts, the curability of the composition formed will be poor. If, on the contrary, the amount is larger than 30 parts, the solubility of the polymer in organic solvents will be low, and the stability of the dispersed polymer will be poor.

The arm site (2) bonding to the core site (1) accounts for from 10 to 90%, preferably from 20 to 50% of the dispersed polymer. If the amount of the arm site (2) is larger than 90% of the dispersed polymer, cured products with good durability are difficult to obtain. If, on the contrary, the amount is smaller than 10%, the viscosity of the dispersed polymer will be too high, or the dispersed polymer will have poor stability and will give precipitates.

The non-aqueous dispersed polymer may be produced by forming the organic solvent-soluble arm site (2) through polymerization of suitable monomers, followed by forming the core site (1) through dispersion polymerization of vinylic monomers such as those mentioned above in the organic solvent containing the polymer for the arm site (2).

As specific examples of the hydroxyl group-having compounds for the component (D), which are not vinylic copolymers, mentioned are organic polyols such as polycaprolactone-polyol, polyvalerolactone-polyol, polyhexamethylene carbonate-polyol, etc.

Where the component (D) is not a non-aqueous dispersed polymer, it is desirable that the number-average molecular weight of the compound of the component (D) falls between 1,000 and 25,000, more preferably between 1,000 and 15,000. If the number-average molecular weight of the compound is smaller than 1,000, the weather resistance and the waterproofness of the coating films from the composition will be poor. If, on the contrary, it is larger than 25,000, the compatibility of the constituent components will be poor.

Where the component (D) is a non-aqueous dispersed polymer, it is also desirable that the number-average molecular weight of the organic solvent-soluble polymer that constitutes the non-aqueous dispersed polymer falls between 1,000 and 25,000, more preferably between 1,000 and 15,000. If the number-average molecular weight of the polymer is smaller than 1,000, the stability of the dispersed polymer will be poor. If, on the contrary, it is larger than 25,000, the polymer forming the arm site could hardly dissolve in organic solvents.

The amount of the component (D) in the composition may be from 0 to 80 parts relative to 100 parts of the total solid content of the components (A) and (B) therein. If the amount of the component (D) is larger than 80 parts, the acid resistance and the waterproofness of the coating films from the composition will be poor. Preferably, the amount of the component (D) is from 0 to 60 parts, more preferably from 0 to 50 parts, even more preferably from 0.001 to 50 parts.

Where the hydroxyl group-having compound of the component (D) is not a non-aqueous dispersed polymer, it is desirable that the amount of the component (A) and that of the component (D) to be added to the composition are so controlled that the number of the alcoholic hydroxyl group in the component (D) added is less than 0.1 per one $R^3O$—Si group in the component (A) added.

Where the hydroxyl group-having compound of the component (D) is a non-aqueous dispersed polymer, it is desirable that the amount of the component (A) and that of the component (D) to be added are so controlled that the number of the alcoholic hydroxyl group in the arm site in the component (D) added is less than 0.2, more preferably less than 0.1, per one $R^3O$—Si group in the component (A) added.

In any case, if the alcoholic hydroxyl group in the component (D) added is too much, the acid resistance and the waterproofness of the coating films from the composition will be poor.

Component (E)

The curable composition of the invention may further contain an amino resin as the component (E), in addition to the components noted above, for the purpose of further improving the curability of the composition and improving the outward appearance of the coating films from the composition. The amount of the amino resin for the component (E) may be up to 30 parts, preferably up to 15 parts, more preferably up to 5 parts, relative to 100 parts of the total solid resin content of the components (A), (B) and (C). If the amount of the amino resin (E) is larger than 30 parts, the acid resistance of the coating films from the composition will be poor. In order to more effectively attain its effect, the amount of the component (E) to be added is desirably 1 part or more.

As examples of the amino resin (E), mentioned are amino resins (methylolated amino resins such as melamine resins, urea resins, guanamine resins, etc.), which may be prepared through reaction of an amino component, such as melamine, urea, benzoguanamine, glycol urea, acetoguanamine, dicyandiamide or the like, and an aldehyde component such as formaldehyde, paraformaldehyde, acetaldehyde, benzaldehyde or the like.

Of those amino resins, preferred are melamine resins, since the final appearance of the coating films from the composition is good and since the curability of the composition is good.

The amino resins (e.g., methylolated amino resins) may be etherified with alcohols such as methyl alcohol, ethyl alcohol, n-propyl alcohol, iso-propyl alcohol, n-butyl alcohol, iso-butyl alcohol, 2-ethylbutanol, 2-ethylhexanol, etc.

Specific examples of the amino resin (E) include n-butylated melamine resins such as Mitsui Toatsu Chemical's Uban 20SE, Uban 20SE-60, Uban 128, Uban 220, Uban 225, Uban 20SB, Uban SE-60, Uban 21R, Uban 22R, Uban 122, Uban 28-60, Uban 20HS, Uban 2028, Uban 202, Uban 120, etc.; isobutylated melamine resins such as Uban 62, Uban 69-1, Uban 169, Uban 2061, etc.; butylated urea resins such as Uban 10S-60, Uban 10R, etc.; melamine resins such as Mitsui Cytec's Cymel 303, Cymel 232, Cymel 370, Cymel 325, Cymel 236, Cymel 738, Cymel 771, Cymel 327, Cymel 703, Cymel 701, Cymel 266, Cymel 267, Cymel 285, Cymel 235, Cymel 238, Cymel 1141, Cymel 272, Cymel 254, Cymel 202, Cymel 1156, Cymel 1158, Cymel 300, Cymel 301, Cymel 350, Cymel 736, etc. Of those, preferred are alkyl-etherified melamine resins such as Cymel 235, Cymel 238, Cymel 1158, etc., in view of the curability of the composition.

Other Components

The curable composition for top coating of the invention may further contain any other optional components such as those to be mentioned hereinunder, in addition to the components mentioned above.

(F1) Isocyanate Group-having Compounds:

As the case may be, the composition may optionally contain a compound having 2 or more, preferably from 2 to 8 isocyanate groups on average in one molecule, in an amount of not larger than 30 parts, preferably not larger than 15 parts, more preferably not larger than 5 parts, relative to 100 parts of the total solid resin content of the components (A), (B) and (C), and the adhesiveness of the composition could be further increased. If, however, the amount of the isocyanate group-having compound (F1) added is larger than 30 parts, the cured products of the composition will be yellowed, and the balance between the storage stability and the curability of the composition will be difficult to take. In order to more effectively exhibit the effect of the component (F1), it is desirable that the composition contains the component (F1) in an amount of not smaller than 1 part.

If the number of the isocyanate groups in the component (F1) is smaller than 2 in one molecule, the effect of the component (F1) to improve the adhesiveness of the composition will be poor.

Specific examples of the isocyanate group-having compound (F1) include hexamethylene diisocyanate, tolylene 2,4-diisocyanate, 4,4'-diphenylmethane diisocyanate, dicyclohexylmethane 4,4'-diisocyanate, isophorone diisocyanate, 2,2,4-trimethyl-1,6-diisocyanatohexane, etc. Their biurets, adducts, isocyanurates, prepolymers and blocks are also employable herein.

Two or more of these compounds may be used in combination.

Of the compounds mentioned above, preferred are blocks of hexamethylene diisocyanate, dicyclohexylmethane 4,4'-isocyanate, isophorone diisocyanate, and 2,2,4-trimethyl-1,6-diisocyanatohexane, in view of the weather resistance of the coating films from the composition, and of the balance between the storage stability and the thermal curability of the composition.

As specific examples of the compounds, mentioned are Colonate 2515, 2517, 2507, 2527, 2513, 2529, 2539 (all products of Nippon Polyurethane Industry); VESTANAT B 1358/100, 1358A, 1370 (all products of Hulsu Japan); Desmodur BL3175, 4165 (both products of Sumitomo Bayer Urethane).

(F2) Curing Catalysts:

In order to further improve the curability of the composition, a curing catalyst (F2) may be added to the composition.

The curing catalyst (F2) is not specifically defined, so far as it is usable as a curing catalyst for hydrolyzable silyl group-having compounds, or usable in esterification of acids with epoxy compounds.

As specific examples of the curing catalyst (F2), for example, mentioned are organic tin compounds such as dibutyl tin dilaurate, dibutyl tin dimaleate, dioctyl tin dilaurate, dioctyl tin dimaleate, tin octylate, etc.; phosphoric acid or phosphates such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, etc.; adducts of phosphoric acid and/or monophosphates to epoxy compounds, such as propylene oxide, butylene oxide, cyclohexene oxide, glycidyl methacrylate, glycidol, acrylglycidyl ether, γ-glycidoxypropyltrimethoxysilane, γ-glycidoxypropyltriethoxysilane, γ-glycidoxypropylmethyldimethoxysilane, Yuka Shell Epoxy's Cardula E, Yuka Shell Epoxy's Epikote 828, Epikote 1001, etc.; organic titanate compounds; organic aluminium compounds; organic zinc compounds; carboxylic acid compounds (organic carboxylic acid compounds) such as maleic acid, adipic acid, azelaic acid, sebacic acid, itaconic acid, citric acid, succinic acid, phthalic acid, trimellitic acid, pyromellitic acid, etc., and their anhydrides; sulfonic acid compounds (organic sulfonic acid compounds) such as dodecylbenzenesulfonic acid, paratoluenesulfonic acid, 1-naphthalenesulfonic acid, 2-naphthalenesulfonic acid, etc., and those sulfonic acid compounds as blocked with nitrogen-containing compounds (e.g., 1-amino-2-propanol, monoethanolamine, diethanolamine, 2-(methylamino)ethanol, 2-dimethylethanolamine, 2-amino-2-methyl-1-propanol, diisopropanolamine, 3-aminopropanol, 2-methylamino-2-methylpropanol, morpholine, oxazolidine, 4,4-dimethyloxazolidine, 3,4,4-trimethyloxazolidine, etc.) (these are reaction products of acids and amines) (for example, Kind Industries' NACURE 5225, NACURE 5543, NACURE 5925, etc.); amines such as hexylamine, di-2-ethylhexylamine, N,N-dimethyldodecylamine, dodecylamine, DABCO, DBU, morpholine, diisopropanolamine, etc.; reaction products of those amines with acidic phosphates; alkaline compounds such as sodium hydroxide, potassium hydroxide, etc.; quaternary ammonium salts such as benzyltriethylammonium chloride or bromide, tetrabutylammonium chloride or bromide, etc.; phosphonium salts, etc. One or more of these curing catalysts may be used either singly or as combined.

The amount of the curing catalyst (F2) to be in the composition may be at most 10 parts, preferably at most 5 parts, more preferably at most 2 parts, relative to 100 parts of the total solid resin content of the components (A), (B) and (C) therein.

(F3) Solvents:

For the curable composition of the invention, used are solvents (F3) in addition to the constituent components mentioned above. The solvents (F3) are not specifically defined, provided that the components (A) to (C) constituting the composition of the invention are soluble or stably dispersible therein. As typical examples of the solvents, mentioned are the solvents usable in preparing the vinylic copolymer (A), for example, hydrocarbons such as toluene, xylene, cyclohexane, n-hexane, octane, etc.; alcohols such as methanol, ethanol, iso-propanol, n-butanol, iso-butanol, sec-butanol, t-butanol, ethylene glycol monoalkyl ethers, etc.; esters such as methyl acetate, ethyl acetate, butyl acetate, etc.; ketones such as acetone, methyl ethyl ketone, methyl isobutyl ketone, cyclohexanone, etc. Of those, the alcoholic solvents may be used along with dehydrating agents to stably produce good results. The solvents used in polymerization to form the component (A) may be directly used as those for the composition.

The storage stability of the curable composition of the invention may be further improved by adding dehydrating agents and specific solvents to the composition.

The dehydrating agents include, for example, methyl orthoformate, ethyl orthoformate, methyl orthoacetate, ethyl orthoacetate, etc. These may be used either singly or as combined.

The dehydrating agent may be added to the polymerization system for the vinylic copolymer (A) or to the copolymer (A). If, however, the amount of the dehydrating agent added is too much, the coating films from the curable composition will have defects such as pin holes, etc. Therefore, the amount of the dehydrating agent to be added is preferably at most 70 parts, more preferably at most 50 parts, even more preferably at most 20 parts, relative to 100 parts of the vinylic copolymer (A).

The solvents used in polymerization to form the component (A) may be directly used as those for the composition.

The amount of the solvent to be used is not specifically defined. However, if too much solvent is used, the coating films from the composition obtained will have defects, for example, the films will be foamed. Therefore, the amount of the solvent to be used is generally not larger than 70 parts, preferably not larger than 50 parts, more preferably not larger than 20 parts, relative to 100 parts by weight of the vinylic copolymer (A). Where the solvent is used singly without being combined with the dehydrating agent noted above, its amount may be generally from 0.5 to 70 parts, preferably from 1 to 50 parts, more preferably from 2 to 20 parts.

Weather resistance improvers such as UV absorbents, light stabilizers and the like may be added to the curable composition for top coating of the invention, to thereby further improve the weather resistance of the coating films from the composition. In particular, adding both UV absorbent and light stabilizer to the composition is preferred, as more effectively improving the weather resistance of the coating films.

The UV absorbent includes, for example, benzophenones, triazoles, phenylsalicylates, diphenylacrylates, acetophenones, etc. One or more of these may be used either singly or as combined.

The light stabilizer includes, for example, bis(2,2,6-tetramethyl-4-piperidyl) sebacate, bis(1,2,2,6,6-pentamethyl-4-piperidyl) sebacate, bis(1,2,2,6,6-entamethyl-4-piperidyl) 2-(3,5-tert-butyl-4-hydroxybenzyl)-2-n-butylmalonate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, etc. One or more of these may be used either singly or as combined.

The amount of the UV absorbent is generally from 0.1 to 10 parts, preferably from 1 to 5 parts, relative to 100 parts of the solid resin content of the curable composition; and that of the light stabilizer is generally from 0.1 to 10 parts, preferably from 1 to 5 parts, relative to 100 parts of the solid resin content of the curable composition.

One embodiment of using the curable composition of the invention for coating will be mentioned below.

A substrate is first coated with a base coat paint containing metallic powder and/or color pigment, and then overcoated with a clear paint for top coat consisting essentially of a curable composition of the invention.

The base coat paint containing metallic powder and/or color pigment is not specifically defined. For example, it consists essentially of an aminoalkyd resin, an oil-free alkyd resin, a thermosetting acrylic resin, a thermosetting urethane resin, a nitrocellulose lacquer, a modified acrylic lacquer, a straight acrylic lacquer, a cold-setting urethane resin, an acrylic enamel resin, an oxidation-setting alkyd resin, an oxidation-setting, modified alkyd resin (e.g., CAB, etc.), a cold-setting or thermosetting fluorine resin, a hydrolyzable silyl group-having resin, a curable composition of the invention, or a mixture of those, and containing metallic powder and/or color pigment.

The base coat paint containing metallic powder and/or color pigment may be of any type, including, for example, a solution-type paint dissolved in an organic solvent, a non-aqueous dispersion-type paint, a multi-liquid-type paint, a powdery paint, a slurry paint, an aqueous paint, etc.

The metallic powder and the color pigment are not also specifically defined, and any conventional ones are employable. Specific examples of the metallic powder include, for example, aluminium powder, copper powder, mica powder, etc.; and those of the color pigment include, for example, organic pigments such as phthalocyanine blue, toluidine red, benzidine yellow, etc., and inorganic pigments such as titanium oxide, carbon black, red iron oxide, etc. One or more of those metallic powders and color pigments may be used either singly or as combined.

Adding UV absorbent and light stabilizer such as those mentioned hereinabove to the base coat is recommended, as further improving the weather resistance of the coated articles.

If desired, silicone compounds (aminosilane compounds, etc.) such as those mentioned above may be added to the base coat paint containing metallic powder and/or color pigment, by which the adhesiveness between the base coat and the overlying clear top coat may be improved.

In that case, the amount of the silicone compound to be added is generally not larger than 20 parts, preferably from 0.5 parts to 10 parts, relative to 100 parts of the base coat paint containing metallic powder and/or color pigment.

The coated articles of the invention have a clear top coat as painted over a base coat. For example, they may be produced in a 2-coat 1-bake method comprising coating a substrate with a base coat paint containing metallic powder and/or color pigment such as that mentioned above, setting it as such for a few minutes, then further coating it with a clear top coat paint in an wet-on-wet manner, and finally curing it under heat; or in a 2-coat 2-bake method comprising coating a substrate with a base coat paint containing metallic powder and/or color pigment, curing it under heat, then coating it with a clear top coat paint, and further curing it under heat.

Apart from the coating methods mentioned above, also employable is a 3-coat 2-bake method or a 3-coat 3-bake method for producing the coated articles of the invention, which comprises coating a base paint-coated substrate with a clear top coat paint comprising a composition that differs from the curable composition of the invention, curing it under heat, and then, directly or after polishing it or coating it with a primer or a sealant, further coating it with another clear top coat paint consisting essentially of the curable composition of the invention, and thereafter finally curing it under heat.

The coating with the clear top coat paint may be attained in any conventional manner of dipping, spraying, brushing, roll-coating or flow-coating. After having been thus coated, the coated paint layer may be cured under heat at a temperature of 30° C. or higher, preferably at a temperature falling between 55 and 350° C.

The thickness of the coating films varies, depending on the use of the coated articles, and therefore could not be indiscriminately defined. Preferably, however, the thickness of the base coat containing metallic powder and/or color pigment may fall between 10 and 30 pm in view of its masking property; while that of the clear top coat may fall between 20 and 50 $\mu$m in view of its durability.

As the case may be, a paint (pigment-dispersed paint) consisting essentially of the curable composition of the invention along with a color pigment dispersed therein may be applied to substrates to produce coated articles.

The color pigment may be an inorganic pigment, including, for example, titaniumoxide, red ironoxide, carbon black, etc.

The paint comprising the curable composition of the invention and a color pigment, which is for producing the coated articles, may be prepared by dispersing the composition and the pigment in a dispersing device, such as a paint conditioner or the like, in which are used glass beads, etc. If desired, the curable composition of the invention and a color pigment are previously dispersed, and thereafter the curable composition of the invention may be further added to the resulting dispersion; or a composition that differs from the curable composition of the invention and a color pigment are first dispersed, and the resulting dispersion may be mixed with the curable composition of the invention. In the latter case, the ratio of the composition, which differs from the curable composition of the invention and which is first dispersed along with a color pigment, to the curable composition of the invention which is mixed with the previously prepared dispersion (ratio of other composition/composition of the invention, by weight) is preferably at most 50/50, more preferably at most 40/60, even more preferably at most 35/65. The thus-prepared, pigment-dispersed paint may be applied to substrates in the same manner as above for the clear top coat paint, and cured thereon under heat at a temperature not higher than 30° C., preferably at a temperature falling between 55 and 350° C., to produce coated articles.

EXAMPLES

The curable composition for top coating of the invention and also articles coated with it will be described in more detail with reference to the following Examples, which, however, are not intended to restrict the scope of the invention.

Production Example 1

[Production of Component (A), Epoxy Group-having Resins, (a)-1, (a)-2, Epoxy Group and Hydroxyl Group-having Resins, (c)-1, (c)-2; and Component (B), Carboxyl Group-having Vinylic Copolymer, (B)-4]:

The components of "Part 2" in Table 1 below were fed into a reactor equipped with a stirrer, a thermometer, a reflux condenser, a nitrogen gas duct and a dropping funnel, and heated up to 105° C. while introducing nitrogen gas thereinto, and then a mixed solution of "Part 1" was dropwise added thereto at a constant rate over a period of 5 hours.

Next, a mixed solution of "Part 3" was dropwise added to this at a constant rate over a period of 1 hour. Then, this was immediately stirred at 105°C for 2 hours, and thereafter cooled to room temperature.

The solid concentration of the resulting solution, the number-average molecular weight of the copolymer as measured through gel permeation chromatography (GPC), the silicon equivalent, the alcoholic epoxy equivalent and the hydroxyl equivalent are shown in Table 1.

TABLE 1

| Part | Composition | (a)-1 | (a)-2 | (c)-1 | (c)-2 | (B)-4 |
|---|---|---|---|---|---|---|
| 1 | Styrene | 10 | 10 | 15 | 15 | 20 |
|  | Cyclohexyl Methacrylate | 10 | 20 | 10 | 15 | — |
|  | 2-Ethylhexyl Acrylate | 30 | 30 | 30 | 15 | 30 |
|  | Glycidyl Methacrylate | 50 | 20 | 40 | 30 | — |
|  | Isobutyl Methacrylate | — | 20 | — | 6 | 30 |
|  | 2-Hydroxyethyl Methacrylate | — | — | 5 | 19 | — |
|  | Acrylic Acid | — | — | — | — | 20 |
|  | Solvesso 100 | 10 | 10 | 10 | 10 | 10 |
|  | N-butanol | 6 | 6 | 6 | 6 | 6 |
|  | T-butyl Peroxy-2-ethylhexanoate | 5.7 | 4.7 | 5.7 | 5.7 | 5.7 |
| 2 | Solvesso 100 | 15 | 15 | 15 | 15 | 15 |
|  | N-butanol | 10 | 10 | 10 | 10 | 10 |
| 3 | Xylene | 10 | 10 | 10 | 10 | 10 |
|  | T-butyl Peroxy-2-ethylhexanoate | 0.3 | 0.3 | 0.3 | 0.3 | 0.3 |
| Solid Concentration (%) | | 63 | 64 | 63 | 65 | 63 |
| Number-Average Molecular Weight | | 5900 | 6800 | 6000 | 6100 | 6000 |
| Alcoholic Hydroxyl Equivalent | | — | — | 2600 | 684 | — |
| Epoxy Equivalent | | 284 | 710 | 355 | 473 | — |

Production Example 2

[Production of Component (A), (A-1) to (A-6); Comparative Components, (A'-1), (A'-2); and Component (D), (D-1)]:

The components of "Part 2" in Table 2 below were fed into a reactor equipped with a stirrer, a thermometer, a reflux condenser, a nitrogen gas duct and a dropping funnel, and heated up to 115° C. while introducing nitrogen gas thereinto, and then a mixed solution of "Part 1" was dropwise added thereto at a constant rate over a period of 4 hours.

Next, a mixed solution of "Part 3" was dropwise added to this at a constant rate over a period of 1 hour. Then, this was immediately stirred at 115° C. for 2 hours, and thereafter cooled to room temperature. Finally, a mixed solution of "Part 4" was added to this, and stirred (except for (D-1) and (A'-2)).

The solid concentration of the resulting solution, the number-average molecular weight of the copolymer as measured through gel permeation chromatography (GPC), the silicon equivalent, the alcoholic hydroxyl equivalent and the epoxy equivalent are shown in Table 2.

TABLE 2

| Part | Composition | Production Example for Component (A) | | | | | | Production Example for Component (D) | Comparative Production Example | |
|---|---|---|---|---|---|---|---|---|---|---|
| | | A-1 | A-2 | A-3 | A-4 | A-5 | A-6 | D-1 | A'-1 | A'-2 |
| 1 | A-174 | 10 | 25 | 40 | 5 | 20 | 30 | — | 30 | — |
| | Styrene | 20 | 20 | 10 | 15 | 15 | 10 | 25 | 20 | 20 |
| | Cyclohexyl Methacrylate | 18 | 11 | 33 | 14 | — | 20.5 | 15 | 20 | 30 |
| | 2-Ethylhexyl Methacrylate | 5 | 20 | 9.9 | 15 | 15 | 20 | 36 | 10.5 | 20 |
| | Glycidyl Methacrylate | 47 | — | 7.1 | 35 | — | 15 | — | — | 30 |
| | Methylglycidyl Methacrylate | — | 24 | — | — | 30 | — | — | — | — |
| | 2-Hydroxypropyl Acrylate | — | — | — | — | 20 | — | 26 | — | — |
| | 2-Hydroxyethyl Methacrylate | — | — | — | 16 | — | 4.5 | — | 19.5 | — |
| | Solvesso 100 | 8.2 | 8.2 | 8.2 | 8.2 | 8.2 | 8.2 | 12.4 | 8.2 | 8.2 |
| | 1-Butanol | 5.5 | 5.5 | 5.5 | 5.5 | 5.5 | 5.5 | — | 5.5 | 5.5 |
| | V-59 | 4.75 | 5.7 | 4.75 | 5.7 | 4.75 | 4.75 | 5.7 | 4.75 | 3.8 |
| 2 | Solvesso 100 | 15.6 | 15.6 | 15.6 | 15.6 | 15.6 | 15.6 | 15.5 | 15.6 | 15.6 |
| | 1-Butanol | 10.4 | 10.4 | 10.4 | 10.4 | 10.4 | 10.4 | 10.5 | 10.4 | 10.4 |
| 3 | Xylene | 5 | 5 | 5 | 5 | 5 | 5 | 10 | 5 | 5 |
| | V-59 | 0.25 | 0.3 | 0.25 | 0.3 | 0.25 | 0.25 | 0.3 | 0.25 | 0.2 |
| 4 | Methyl Orthoacetate | 4 | 4 | 4 | 4 | 4 | 4 | — | 4 | — |
| | Methanol | 2 | 2 | 2 | 2 | 2 | 2 | — | 2 | — |
| Solid Concentration (%) | | 64 | 64 | 65 | 63 | 64 | 65 | 66 | 64 | 65 |
| Number-Average Molecular Weight | | 5100 | 4600 | 5000 | 4700 | 5200 | 5100 | 4600 | 5000 | 5700 |
| Hydrolyzable Silyl Equivalent | | 2480 | 992 | 620 | 4960 | 1240 | 827 | — | 827 | — |
| Alcoholic Hydroxyl Equivalent | | — | — | — | 813 | 650 | 2889 | 500 | 667 | — |
| Epoxy Equivalent | | 302 | 650 | 2000 | 406 | 520 | 947 | — | — | 473 |
| Alcoholic Hydroxyl Group/Hydrolyzable Silyl Groups | | — | — | — | 6.10 | 1.91 | 0.29 | — | 1.24 | — |

A-174: γ-trimethoxysilylpropyl methacrylate (manufactured by Nippon Union Co.)
V-59: 2,2'-azobis(2-methylbutyronitrile) (manufactured by Wako Pure Chemical Co.)

Production Examples 3 to 5
(Production of Resin 2):

Resin 2 of component (A) (this is a resin having epoxy, polyoxyalkylene and hydroxyl groups) was produced in the manner mentioned below.

The components of "Part 2" in Table 3 below were fed into a reactor equipped with a stirrer, a thermometer, a reflux condenser, a nitrogen gas duct and a dropping funnel, and heated up to 115° C. while introducing nitrogen gas thereinto, and then a mixed solution of "Part 1" was dropwise added thereto at a constant rate over a period of 4 hours.

Next, a mixed solution of "Part 3" was dropwise added to this at a constant rate over a period of 1 hour. Then, this was immediately stirred at 115° C. for 2 hours, and thereafter cooled to room temperature.

The solid concentration of the resulting solution, the number-average molecular weight of the copolymer as measured through gel permeation chromatography (GPC), the alcoholic hydroxyl equivalent (g/mol) and the epoxy equivalent are shown in Table 3.

TABLE 3

| Part | Composition | Production Example | | |
|---|---|---|---|---|
| | | 3 | 4 | 5 |
| 1 | Styrene | 25 | 25 | 25 |
| | 2-Ethylhexyl Acrylate | — | 10 | 5 |
| | Glycidyl Methacrylate | 40 | 25 | 35 |
| | Isobutyl Methacrylate | — | 20 | — |
| | 2-Hydroxyethyl Methacrylate | 15 | 20 | — |
| | 2-Hydroxypropyl Methacrylate | — | — | 5 |
| | Uniox PKA5004(*1) | 20 | — | — |
| | Blemmer AE-350(*2) | — | — | 30 |
| | Blemmer PME400(*3) | — | 10 | — |
| | Solvesso 100 | 10 | 10 | 10 |
| | N-butanol | 6 | 6 | 6 |
| | T-butyl Peroxy-2-ethylhexanoate | 5.7 | 5.7 | 5.7 |
| 2 | Solvesso 100 | 15 | 15 | 16 |
| | N-butanol | 10 | 10 | 10 |
| 3 | Xylene | 10 | 10 | 10 |
| | T-butyl Peroxy-2-ethylhexanoate | 0.3 | 0.3 | 0.3 |
| Solid Concentration | | 62 | 64 | 63 |
| Number-Average Molecular Weight | | 6100 | 5800 | 6100 |
| Alcoholic Hydroxyl Equivalent | | 867 | 650 | 2600 |
| Epoxy Equivalent | | 355 | 568 | 406 |

(*1) polyethylene glycol monoallyl ether (mean molecular weight: 750, manufactured by Nippon Oils & Fats Co.)
$CH_2=CHCH_2O(CH_2CH_2O)_nH$
(*2) polyethylene glycol monoacrylate (manufactured by Nippon Oils & Fats Co.)
$CH_2=CH-CO-O(CH_2CH_2O)_7H$
(*3) methoxypolyethylene glycol monomethacrylate (manufactured by Nippon Oils & Fats Co.)
$CH_2=C(CH_3)-CO-O(CH_2CH_2O)_9-CH_3$ Production Examples 6 to 8
(Production of Resin 1, and Hydroxyl Group-having Resin):

Epoxy group and polyoxyalkylene group-having resin (resin 1) (in Production Examples 6 and 7), and hydroxyl group-having resin (in Production Example 8) were produced in the same manner as in Production Examples 3 to 5, for which were used the components shown in Table 4 and Table 5 below.

The solid concentration of each solution obtained herein, the number-average molecular weight of the copolymer as measured through GPC, the alcoholic hydroxyl equivalent (g/mol) and the epoxy equivalent are shown in Tables 4 and 5.

TABLE 4

| Part | Composition | Production Example 6 | Production Example 7 |
|---|---|---|---|
| 1 | Styrene | 10 | 25 |
|  | Cyclohexyl Methacrylate | — | 10.5 |
|  | 2-Ethylhexyl Acrylate | 25 | 20 |
|  | Glycidyl Methacrylate | 55 | — |
|  | 3,4-Epoxycyclohexyl Methacrylate | — | 19.5 |
|  | Isobutyl Methacrylate | — | — |
|  | Uniox PKA5004 | 10 | — |
|  | Blemmer AE-350 | — | 30 |
|  | Solvesso 100 | 10 | 10 |
|  | N-butanol | 6 | 6 |
|  | T-butyl Peroxy-2-ethylhexanoate | 5.7 | 5.7 |
| 2 | Solvesso 100 | 15 | 16 |
|  | N-butanol | 10 | 10 |
| 3 | Xylene | 10 | 10 |
|  | T-butyl Peroxy-2-ethylhexanoate | 0.3 | 0.3 |
| Solid Concentration |  | 63 | 62 |
| Number-Average Molecular Weight |  | 6000 | 6200 |
| Alcoholic Hydroxyl Equivalent |  | — | — |
| Epoxy Equivalent |  | 258 | 1005 |

TABLE 5

| Part | Composition | Production Example 8 |
|---|---|---|
| 1 | Styrene | 20 |
|  | Cyclohexyl Methacrylate | 20 |
|  | 2-Ethylhexyl Acrylate | 20 |
|  | Isobutyl Methacrylate | 4 |
|  | 2-Hydroxyethyl Methacrylate | 26 |
|  | Uniox PKA5004 | 10 |
|  | Solvesso 100 | 10 |
|  | N-butanol | 6 |
|  | T-butyl Peroxy-2-ethylhexanoate | 5.7 |
| 2 | Solvesso 100 | 15 |
|  | N-butanol | 10 |
| 3 | Xylene | 10 |
|  | T-butyl Peroxy-2-ethylhexanoate | 0.3 |
| Solid Concentration |  | 64 |
| Number-Average Molecular Weight |  | 6200 |
| Alcoholic Hydroxyl Equivalent |  | 500 |

Comparative Production Examples 1 and 2

(Production of Comparative Components 1, 2):

Comparative components 1 and 2 were produced in the same manner as in Production Examples 3 to 5, for which were used the components shown in Table 6 below.

The solid concentration of the solution obtained, the number-average molecular weight of the copolymer as measured through GPC, the alcoholic hydroxyl equivalent (g/mol) and the epoxy equivalent are shown in Table 6.

TABLE 6

| Part | Composition | Comparative Production Example 1 | Comparative Production Example 2 |
|---|---|---|---|
| 1 | Styrene | 25 | — |
|  | 2-Ethylhexyl Acrylate | 20 | — |
|  | Glycidyl Methacrylate | 40 | 40 |
|  | 2-Hydroxyethyl Methacrylate | 15 | 10 |
|  | Blemmer PEM400 | — | 50 |
|  | Solvesso 100 | 10 | 10 |
|  | N-butanol | 6 | 6 |
|  | T-butyl Peroxy-2-ethylhexanoate | 5.7 | 5.7 |
| 2 | Solvesso 100 | 15 | 15 |
|  | N-butanol | 10 | 10 |
| 3 | Xylene | 10 | 10 |
|  | T-butyl Peroxy-2-ethylhexanoate | 0.3 | 0.3 |
| Solid Concentration |  | 62 | 64 |
| Number-Average Molecular Weight |  | 6100 | 5800 |
| Alcoholic Hydroxyl Equivalent |  | 867 | 1300 |
| Epoxy Equivalent |  | 350 | 350 |

Comparative Production Example 3

(Production of Polymer B'):

In the same manner as in Production Examples 3 to 5 except that the components indicated in Table 7 below were used, produced was polymer b'.

The solid concentration of the solution obtained, and the number-average molecular weight of the polymer b, (as measured through GPC) are shown in Table 7.

To 192.3 parts of the polymer b', added were 1.0 part of triethylamine and 10 parts of methanol as dissolved in 17.6 parts of butyl acetate, and reacted at 60° C. for 8 hours. Thus was obtained polymer B'. In its IR, confirmed was the absence of the absorption by acid anhydride groups (at 1,785 cm$^{-1}$).

TABLE 7

| Part | Composition | Comparative Production Example 3 |
|---|---|---|
| 1 | Styrene | 15 |
|  | Cyclohexyl Methacrylate | 20 |
|  | 2-Ethylhexyl Acrylate | 30 |
|  | Isobutyl Methacrylate | 14.5 |
|  | Maleic Anhydride | 20.5 |
|  | Solvesso 100 | 20.5 |
|  | Propylene Glycol Monomethyl Ether Acetate | 4.1 |
|  | T-butyl Peroxy-2-ethylhexanoate | 5.7 |
| 2 | Solvesso 100 | 26 |
| 3 | Xylene | 10 |
|  | T-butyl Peroxy-2-ethylhexanoate | 0.3 |
| Solid Concentration (%) |  | 52 |
| Number-Average Molecular Weight |  | 6000 |

Production Example 9

[Production of Carboxylic Acid Oligomers, (B-1) to (B-3)]:

The components of "Part 1" in Table 8 below were fed into a reactor equipped with a stirrer, a thermometer, a reflux condenser, a nitrogen gas duct and a dropping funnel, and stirred at 120° C. for 15 minutes while introducing nitrogen gas thereinto, and thereafter the components of "Part 2" were added thereto over a period of 15 minutes.

Then, these were reacted at 120° C. for 3 hours. The IR absorption spectrum of the reaction product was measured, in which the absence of the absorption by acid anhydride groups (at 1,785 cm$^{-1}$) was confirmed.

TABLE 8

| Part | Composition | (B-1) | (B-2) | (B-3) |
|---|---|---|---|---|
| 1 | Triethylamine | 0.07 | 0.07 | 0.07 |
|   | Pentaerythritol | 36 | — | — |
|   | 1,5-Pentanediol | — | 36 | — |
|   | Trimethylolpropane | — | — | 34 |
|   | Propylene Glycol Monomethyl Ether Acetate | 110 | 73 | 76 |
| 2 | Phthalic Anhydride | — | 100 | — |
|   | Methylhexahydrophthalic Anhydride | 169 | — | — |
|   | Hexahydrophthalic Anhydride | — | — | 113 |
| Solid Concentration (%) | | 65 | 65 | 66 |
| Molecular Weight | | 809 | 412 | 597 |

Finally, the excess solvent was removed. Thus was obtained a stable dispersion with no phase separation, which had a solid content of 63.4% and was milky.

The resulting polymer had a Stormer viscosity of 76 KU and a mean particle size of 300 nm.

The "solution containing organic solvent-soluble polymer" in "Part 1" of the starting material was prepared by polymerizing the monomers shown in parenthesis in the solvent also shown in parenthesis. This polymer forms the arm site (2).

On the other hand, the polymer of methacrylic acid, 2-hydroxyethyl acrylate, methyl methacrylate, methyl acrylate, styrene and glycidyl methacrylate in "Part 3" of the starting forms the core site (1).

TABLE 9

Production Example for Component (D) (Part II)
D-2

| Part | Composition | Amount |
|---|---|---|
| 1 | Solution Containing Organic Solvent-Soluble Polymer (Mw = 3500) (solution of 62% acrylic polymer composed of 15% of styrene, 28% of butyl methacrylate, 30% of butyl acrylate, 10% of 2-hydroxyethyl acrylate, 2% of acrylic acid, and 15% of ethyl methacrylate, in which the solvent is a mixture of 82% of xylene and 18% of 1-butanol) | 579 g |
|   | Isopropanol | 22 g |
|   | Mineral Sprit | 41 g |
|   | Heptane | 460 g |
|   | Xylene | 95 g |
| 2 | T-butyl Peroctanoate | 1 g |
| 3 | Methacrylic Acid | 40 g |
|   | 2-Hydroxyethyl Acrylate | 250 g |
|   | Methyl Methacrylate | 365 g |
|   | Methyl Acrylate | 180 g |
|   | Styrene | 150 g |
|   | Glycidyl Methacrylate | 15 g |
|   | Solution Containing Organic Solvent-Soluble Polymer (same as in Part 1) | 290 g |
|   | Heptane | 26 g |
| 4 | Mineral Spirit | 148 g |
|   | 1-Butanol | 26 g |
|   | T-butyl Peroctanoate | 11 g |
| 5 | T-butyl Peroctanoate | 8 g |
|   | 1-Butanol | 59 g |
|   | Heptane | 6 g |

Production Example 10

[Production of Non-aqueous Dispersed, Hydroxyl-having Polymer (D-2)]:

The components of "Part 1" in Table 9 below were fed into a reactor, and heated at the refluxing temperature (97° C.). Next, the component of "Part 2" was added thereto, and immediately the components of "Part 3" and "Part 4" were added thereto at a constant rate over a period of 225 minutes.

The mixture was transparent in the initial stage, but immediately after the addition of the "Part 3" and the "Part 4" thereto, it became pale blue, and then became milky in 40 minutes.

After this, the components of "Part 5" were added to the mixture at a constant rate over a period of 30 minutes, and then kept at the refluxing temperature for further 90 minutes.

Production Example 11
[Production of Carboxyl Group-having Vinylic Copolymer (B)-5]:

In the same manner as in Production Example 1 except that the components indicated in Table 10 below were used, produced was polymer (B)'-5.

The solid concentration of the solution obtained, and the number-average molecular weight of the polymer (B)'-5 (as measured through GPC) are shown in Table 10.

To 192.3 parts of the polymer (B)'-5, added were 1.0 part of triethylamine and 10 parts of methanol as dissolved in 17.6 parts of butyl acetate, and reacted at 60° C. for 8 hours. Thus was obtained polymer (B)-5. In its IR, confirmed was the complete absence of the absorption by acid anhydride groups (at 1,785 cm$^{-1}$).

TABLE 10

| Part | Composition | (B)'-5 |
|---|---|---|
| 1 | Styrene | 15 |
|   | Cyclohexyl Methacrylate | 20 |
|   | 2-Ethylhexyl Acrylate | 30 |

TABLE 10-continued

| Part | Composition | (B)'-5 |
|---|---|---|
|  | Isobutyl Methacrylate | 14.5 |
|  | Maleic Anhydride | 20.5 |
|  | Solvesso 100 | 20.5 |
|  | Propylene Glycol Monomethyl Ether Acetate | 4.1 |
|  | T-butyl Peroxy-2-ethylhexanoate | 5.7 |
| 2 | Solvesso 100 | 26 |
| 3 | Xylene | 10 |
|  | T-butyl Peroxy-2-ethylhexanoate | 0.3 |
| Solid Concentration (%) |  | 52 |
| Number-Average Molecular Weight |  | 6000 |
| Alcoholic Hydroxyl Equivalent |  | — |
| Epoxy Equivalent |  | — |

Production Example 12
[Production of Epoxy Group and Carboxyl Group-having Vinylic Copolymers, (e)-1, (e)-2]:

The components of "Part 2" in Table 11 below were fed into a reactor equipped with a stirrer, a thermometer, a reflux condenser, a nitrogen gas duct and a dropping funnel, and heated up to 80° C. while introducing nitrogen gas thereinto, and then a mixed solution of "Part 1" was dropwise added thereto at a constant rate over a period of 3 hours.

Next, a mixed solution of "Part 3" was dropwise added to this at a constant rate over a period of 1 hour. Then, this was immediately stirred at 80° C. for 2 hours, and thereafter cooled to room temperature.

The solid concentration of the resulting solution, the number-average molecular weight of the copolymer as measured through gel permeation chromatography (GPC), the silicon equivalent and the alcoholic epoxy equivalent are shown in Table 11.

TABLE 11

| Part | Composition | (e)-1 | (e)-2 |
|---|---|---|---|
| 1 | Styrene | 20 | 20 |
|  | Cyclohexyl Methacrylate | 15 | 24 |
|  | 2-Ethylhexyl Acrylate | 31.5 | 35 |
|  | Glycidyl Methacrylate | — | 14 |
|  | Methylglycidyl Methacrylate | 26 | — |
|  | Acrylic Acid | 7.5 | 6.0 |
|  | Solvesso 100 | 24 | 24 |
|  | N-butanol | 6 | 6 |
|  | T-butyl Peroxy-2-ethylhexanoate | 6.2 | 4.8 |
| 2 | Solvesso 100 | 40 | 40 |
|  | N-butanol | 10 | 10 |
| 3 | Xylene | 10 | 10 |
|  | T-butyl Peroxy-2-ethylhexanoate | 0.3 | 0.2 |
| Solid Concentration |  | 52 | 53 |
| Number-Average Molecular Weight |  | 6500 | 5500 |
| Epoxy Equivalent |  | 600 | 1014 |
| Molar ratio, epoxy groups/carboxyl groups |  | 1.6 | 1.18 |

Examples 1-1 to 1-5, 2-1 to 2-10, 3-1 to 3-10, 4-1 to 4-4, Comparative Examples 1-1 to 1-7, 2-1 to 2-6, 3-1 to 3-4:

The components as prepared in Production Examples mentioned above were formulated in different solid ratios as in the following Tables.

To the resulting mixtures of Examples and Comparative Examples, added were 0.4%, relative to the total solid resin content of each mixture, of a leveling agent (Kusumoto Chemical's L-1984-50), 2% of anUVabsorbent, Tinuvin 384, and 1% of a light stabilizer, Tinuvin 123 (both products of Ciba Geigy).

Next, each mixture was diluted with Solvesso 100 (petroleum-type aromatic solvent, a product of Exxon Chemical) to have a viscosity taking about 20 to about 25 seconds in a Ford cup. Thus were prepared various clear paint samples for top coating.

A soft steel sheet was degreased and phosphorylated, and then coated with an epoxyamide-based, cationic electrodeposition primer and an intermediate-coating surfacer in that order, the both being for car bodies. The thus-coated sheet was used as a test substrate herein. The substrate was further coated with a commercially-available acrylic melamine resin-based coating material (black base coat). For samples for evaluating stain resistance, the substrate was coated with a white base coat.

Next, after the thus-coated substrate was set for 5 to 10 minutes, the clear paint sample for top coating was applied on the substrate in an wet-on-wet coating manner, set as such for 20 minutes, and then baked at 140° C. for 30 minutes.

The dry thickness of the base coat was about 15 $\mu$m, and that of the clear top coat was about 50 $\mu$m.

The coating films thus formed herein were tested for (1) acid resistance, (2) scratch resistance, (3) outward appearance, (4) recoating adhesiveness, (5) accelerated weather resistance, (6) pencil hardness, (7) stain resistance, (8) hydrophilicity, (9) thermal curability (in terms of gel fraction), (10) hot water resistance, and (11) hot water-resistant adhesiveness, according to the methods mentioned below. The test data obtained are shown in Table 12 to Table 18.

(1)-1 Acid Resistance:

0.5 cc of an aqueous solution of 10% sulfuric acid was dripped onto each coated sample through a pipette, and then heated in a drier at 80° C. for 30 minutes. After thus dried, the sample was washed with water to remove the sulfuric acid solution, and the condition of the surface of the coating film on the sample was visually observed. Each sample was evaluated according to the following criteria:

Point 10: No change found.

Point 9: Slight change found.

Point 8: Circular marks found.

Point 7: Slightly discolored and swollen.

Point 5: Definitely discolored with definite decrease in surface gloss.

Point 1: Coating film dissolved.

(1)-2 Acid Resistance:

Four drops of an aqueous solution of 40% sulfuric acid were dripped onto each coated sample through a pipette, and then heated at 70° C. for 30 minutes. The samples were tested and evaluated in the same manner as in 1-1.

(2) Scratch Resistance (Surface Gloss Retentiveness):

Each coated sample (150mm×100 mm) was fixed horizontally, to which was applied an abrasive (mixture of 1.2% of JIS Type 8 loam, 1.2% of JIS Type 11 loam, 0.6% of kaolin, 1% of neutral detergent and 96% of water) in an amount of about 0.05 g/cm$^2$. In that condition, the surface of the sample was rubbed with a weight covered with kraft paper. The contact surface of the weight had a diameter of 5 cm, and the load thereof was 22 g/cm$^2$.

Before and after rubbed for 20 strokes, the surface gloss of the coating film of each sample was measured at an angle of 20°, using a gloss meter (manufactured by Murakami Color Technology Laboratory). The surface gloss retentiveness (%) of each sample after 20 strokes was obtained according to the following equation.

Surface Gloss Retentiveness (%)=(surface gloss after rubbed/surface gloss before rubbed)×100

Samples having a higher degree of surface gloss retentiveness have better scratch resistance.

(3) Outward Appearance:

The surface gloss and the specular appearance of each coated sample were visually observed. The samples were ranked as follows, for their outward appearance.

○: Good

Δ: Average

X: Bad (4) Recoating Adhesiveness:

Each coated sample was again coated with the same base coat and then with the same clear paint in an wet-on-wet coating manner, in the same manner as previously. After having been set as such for 20 minutes, the samples were baked at 120° C. for 30 minutes. The adhesiveness of the coating film on each sample was measured according to the cross-cut peeling test (2 mm×2 mm×25) in JIS K 5400.

(5) Accelerated Weather Resistance:

Each coated sample was evaluated for the accelerated weather resistance according to JIS K 5400, using a sunshine carbon arc lamp weather resistance tester (manufactured by Suga Shikenki KK).

The test condition was as follows: Each sample was exposed to the carbon arc lamp for 1,500 hours at a black panel temperature of 63+/−3° C. in repeated intermittent raining cycles. In one cycle of 120 minutes, raining continued for 18 minutes. After the test, each sample was visually observed, and evaluated according to the following criteria:

○: No change.

○Δ: Water marks found, or whitened.

Δ: Great water marks found with definite decrease in surface gloss.

(6) Pencil Hardness:

The pencil hardness of each sample was measured according to JIS K 5400.

(7) Stain Resistance:

Coated samples were exposed to open air on a test stand facing to the south at an angle of 30°, in Settsu-shi of Osaka for 3 months. Before and after the exposure, the lightness of each sample was measured with a color-difference meter (Minolta's CR300 Model), based on the color system of L*a*b*, and the absolute value (ΔL) of the difference in the lightness between the non-exposed sample and the exposed sample was obtained, which indicates the stain resistance of each sample. Samples for which the absolute value obtained was smaller have better stain resistance, and those for which it was larger were stained more.

(8) Hydrophilicity:

Coated samples were exposed to open air on a test stand facing to the south at an angle of 30°, in Settsu-shi of Osaka for 3 months. Before and after the exposure, the degree of hydrophilicity of each sample was measured with a contact angle meter (Kyowa Kaimen Kagaku's CA-S150 Model). For this, the contact angle between the surface of each of the exposed and non-exposed samples and a water drop thereon was measured with the device. Samples having smaller values of the contact angle measured have a higher degree of hydrophilicity.

(9) Thermal Curability (In Terms of Gel Fraction):

Each sample for clear top coating was applied on tin foil, and baked thereon at 120° C. or 140° C. for 30 minutes to form a peelable clear film having a thickness of about 40 μm. The film was peeled off and cut into test pieces of about 50×50 mm in size. Each test piece was wrapped in 200-mesh, stainless wire gauze, of which the weight had been accurately measured ($W_0$), and its weight including the weight of the wire gauze was measured ($W_1$). Next, the thus-wrapped test piece was dipped in acetone for 24 hours for extraction, and dried, and its weight was accurately measured ($W_2$). The gel fraction (%) of each sample was obtained according to the following equation.

$$\text{Gel Fraction } (\%) = \{(W_2-W_0)/(W_1-W_0)\} \times 100$$

(10) Hot Water Resistance:

Coated samples were dipped in hot water at 50° C. for 10 days, taken out, and checked for their outward appearance. According to the following criteria, the hot water resistance of each sample was evaluated.

○: No change

Δ: Whitened in some degree.

(11) Hot Water-resistant Adhesiveness:

In the same manner as previously, a commercially-available, acrylic melamine clear paint was applied to each white base-coated sample, and baked thereon at 160° C. for 30 minutes. Next, without being degreased and polished, this was coated with a clear top coat paint having the composition shown in Table 18 below, set as such for 10 minutes, and baked at 140° C. for 20 minutes. Directly, or after having been dipped in hot water at 80° C. for 24 hours, each sample was subjected to the cross-cut peeling test (2 mm×2 mm ×25) in JIS K 5400, and its coating film adhesiveness was evaluated.

TABLE 12

|  |  |  | Example | | | | |
|---|---|---|---|---|---|---|---|
|  |  |  | 1-1 | 1-2 | 1-3 | 1-4 | 1-5 |
| Composition (parts) | Components (A), (B) | (a)-1 | 60 | — | — | — | — |
|  |  | (a)-2 | — | 85 | — | — | — |
|  |  | (B)-1 | 40 | — | — | 25 | — |
|  |  | (B)-3 | — | 15 | 30 | — | 30 |
|  |  | (c)-1 | — | — | 70 | — | 70 |
|  |  | (c)-2 | — | — | — | 75 | — |
|  |  | (B)-4 | — | — | — | — | — |
|  |  | (B)-5 | — | — | — | — | — |
|  |  | (e)-1 | — | — | — | — | — |
|  |  | (e)-2 | — | — | — | — | — |
|  | Component (C) | MS-51 | — | 20 | — | 15 | — |
|  |  | MS-56 | 10 | — | 5 | — | — |
|  |  | MS-56S | — | — | — | — | 5 |
|  |  | HAS-1 | — | — | — | — | — |

TABLE 12-continued

|  |  |  | Example 1-1 | Example 1-2 | Example 1-3 | Example 1-4 | Example 1-5 |
|---|---|---|---|---|---|---|---|
|  | Component (F2) | tetrabutyl-ammonium bromide | — | — | 0.3 | 0.3 | 0.3 |
| Evaluation | (3) Outward Appearance |  | ○ | ○ | ○ | ○ | ○ |
|  | (9) Gel Fraction (%) |  | 97 | 95 | 95 | 93 | 95 |
|  | (1)-1 Acid resistance |  | 10 | 10 | 10 | 10 | 10 |
|  | (2) Scratch Resistance (surface gloss retentiveness) (%) |  | 78 | 77 | 79 | 76 | 79 |
|  | (7) Stain Resistance (ΔL) |  | 1.0 | 1.8 | 1.1 | 2.3 | 0.9 |
|  | (5) Accelerated Weather Resistance |  | ○ | ○ | ○ | ○ | ○ |
|  | (8) Hydrophillicity, contact angle (°) (before exposure/after exposure) |  | 69/30 | 77/45 | 71/39 | 79/50 | 69/32 |
| Molar Ratio (epoxy groups/carboxyl groups) |  |  | 1.07 | 1.60 | 1.32 | 1.29 | 1.32 |

(*) Gel Fraction: in samples baked at 120° C.
Component (C):
MS-51: partially-hydrolyzed condensate of methyl silicate (manufactured by Mitsubishi Chemical) having a weight-average molecular weight of 600.
MS-56: partially-hydrolyzed condensate of methyl silicate (manufactured by Mitsubishi Chemical) having a weight-average molecular weight of 1100.
MS-56S: partially-hydrolyzed condensate of methyl silicate (manufactured by Mitsubishi Chemical) having a weight-average molecular weight of 1700.

TABLE 13

|  |  |  | Comparative Example 1-1 | 1-2 | 1-3 | 1-4 | 1-5 | 1-6 | 1-7 |
|---|---|---|---|---|---|---|---|---|---|
| Composition (parts) | Components (A), (B) | (a)-1 | 60 | — | 50 | — | — | acrylic melamine | — |
|  |  | (a)-2 | — | — | — | — | — |  | 100 |
|  |  | (B)-1 | 40 | 30 | — | — | — |  | — |
|  |  | (B)-3 | — | 70 | — | — | — |  | — |
|  |  | (c)-1 | — | — | — | 50 | — |  | — |
|  |  | (c)-2 | — | — | — | — | — |  | — |
|  |  | (B)-4 | — | — | 50 | — | — |  | — |
|  |  | (B)-5 | — | — | — | 50 | — |  | — |
|  |  | (e)-1 | — | — | — | — | 100 |  | — |
|  |  | (e)-2 | — | — | — | — | — |  | — |
|  | Component (C) | ESI-40 | — | — | — | — | — |  | 20 |
|  | Component (F2) | tetrabutyl-ammonium bromide | — | 0.3 | — | 0.3 | 0.4 |  | — |
|  |  | dodecanoic dicarboxylic acid | — | — | — | — | — |  | 20 |
| Evaluation | (3) Outward Appearance |  | ○ | ○ | ○ | ○ | ○ | ○ | ○ |
|  | (9) Gel Fraction (%) |  | 95 | 96 | 94 | 93 | 95 | 94 | 90 |
|  | (1)-1 Acid resistance |  | 10 | 10 | 10 | 10 | 9 | 1 | 9 |
|  | (2) Scratch Resistance (surface gloss retentiveness) (%) |  | 76 | 65 | 77 | 64 | 60 | 50 | 52 |
|  | (7) Stain Resistance (ΔL) |  | 7.3 | 6.9 | 7.0 | 6.3 | 6.5 | 7.6 | 3.4 |
|  | (5) Accelerated Weather Resistance |  | ○ | Δ○ | ○ | Δ○ | Δ○ | Δ○ | Δ○ |
|  | (8) Hydrophilicity contact angle (°) (before exposure/after exposure) |  | 85/75 | 88/77 | 83/74 | 85/71 | 84/73 | 90/83 | 77/62 |
| Molar Ratio (epoxy groups/carboxyl groups) |  |  | 1.07 | 1.32 | 1.27 | 1.01 | 1.60 | — | 0.81 |

(*) Gel Fraction in samples baked at 120° C.

From the test data in Table 12 and Table 13, it is known that the coating films obtained in Examples 1-1 to 1-11 all had excellent acid resistance and scratch resistance, and additionally had excellent stain resistance.

TABLE 14

| | | | Example | | | | | | | | | |
|---|---|---|---|---|---|---|---|---|---|---|---|---|
| | | | 2-1 | 2-2 | 2-3 | 2-4 | 2-5 | 26 | 2-7 | 2-8 | 2-9 | 2-10 |
| Composition (parts) | Component (A) | (A-1) | 70 | 65 | — | — | — | — | — | — | — | — |
| | | (A-2) | — | — | 80 | — | — | — | — | — | — | — |
| | | (A-3) | — | — | — | 75 | — | — | — | — | — | — |
| | | (A-4) | — | — | — | — | 80 | — | — | — | — | — |
| | | (A-5) | — | — | — | — | — | 70 | 70 | — | — | — |
| | | (A-6) | — | — | — | — | — | — | — | 85 | 75 | 75 |
| | Comparative Component | (A'-1) | — | — | — | — | — | — | — | — | — | — |
| | | (A'-2) | — | — | — | — | — | — | — | — | — | — |
| | Component (B) | (B-1) | — | — | 20 | — | 20 | — | — | 15 | 15 | 15 |
| | | (B-2) | 30 | 30 | — | — | — | — | — | — | — | — |
| | | (B-3) | — | — | — | 5 | — | 30 | 25 | — | — | — |
| | Component (C) | HAS-1 | — | 20 | — | 30 | 35 | — | — | 30 | 30 | — |
| | | MS-56 | 5 | — | 10 | — | — | 15 | 10 | — | — | — |
| | | MS-56S | — | — | — | — | — | — | — | — | — | 15 |
| | Component (F2) | tetrabutyl-ammonium bromide | — | — | 0.2 | — | — | 0.2 | 0.2 | — | — | — |
| | | Nacure 5225 | — | — | — | 2.0 | — | — | — | — | — | — |
| | Component (D) | (D-1) | — | — | — | 20 | — | — | — | — | 10 | 10 |
| | | (D-2) | — | — | — | — | — | — | — | — | — | — |
| | Component (E) | Cymel 235 | — | 5 | — | — | — | — | — | 5 | — | — |
| Evaluation | (1)-1 acid resistance | | 10 | 10 | 10 | 10 | 10 | 10 | 10 | 10 | 10 | 10 |
| | (2) scratch resistance (surface gloss retentiveness, %) | | 91 | 92 | 89 | 90 | 88 | 90 | 91 | 89 | 88 | 89 |
| | (3) outward appearance | | ○ | ○ | ○ | ○ | ○ | ○ | ○ | ○ | ○ | ○ |
| | (4) recoating adhesiveness | | 10 | 10 | 10 | 10 | 10 | 10 | 10 | 10 | 10 | 10 |
| | (5) accelerated weather resistance | | ○ | ○ | ○ | ○ | ○ | ○ | ○ | ○ | ○ | ○ |
| | (6) pencil hardness | | 2H | 2H | H | H | H | 2H | H | H | H | H |
| | (7) stain resistance (ΔL) | | 1.3 | 1.7 | 1.5 | 1.4 | 2.0 | 1.5 | 2.3 | 2.1 | 1.9 | 1.3 |
| | (8) hydrophilicity (before exposure/after exposure)(*) | | 68/38 | 76/53 | 69/41 | 74/48 | 77/49 | 67/40 | 70/46 | 73/50 | 79/44 | 74/40 |
| Molar Ratio (epoxy groups/carboxyl groups) | | | 1.56 | 1.44 | 1.25 | 0.37 | 2.0 | 0.90 | 1.08 | 1.21 | 1.07 | 1.07 |

TABLE 15

| | | | Comparative Example | | | | | |
|---|---|---|---|---|---|---|---|---|
| | | | 2-1 | 2-2 | 2-3 | 2-4 | 2-5 | 2-6 |
| Composition (parts) | Component (A) | (A-1) | 70 | — | — | — | — | Acrylic Melamine |
| | | (A-2) | — | 80 | — | — | — | |
| | | (A-3) | — | — | — | — | — | |
| | | (A-4) | — | — | — | — | — | |
| | | (A-5) | — | — | 70 | — | — | |
| | | (A-6) | — | — | — | — | — | |
| | Comparative Component | (A'-1) | — | — | — | 80 | — | |
| | | (A'-2) | — | — | — | — | 75 | |
| | Component (B) | (B-1) | — | 20 | — | — | 25 | |
| | | (B-2) | 30 | — | — | — | — | |
| | | (B-3) | — | — | 30 | — | 5 | |
| | Component (C) | HAS-1 | — | — | — | 30 | — | |
| | | MS-56 | — | — | — | — | — | |
| | Component (F2) | tetrabutyl-ammonium bromide | — | — | — | — | — | |
| | | Nacure 5225 | — | — | — | 2.0 | — | |
| | Component (D) | (D-1) | — | — | — | — | — | |
| | | (D-2) | — | — | — | 20 | — | |
| | Component (E) | Cymel 235 | — | — | — | — | — | |
| Evaluation | (1)-1 acid resistance | | 10 | 10 | 10 | 9 | 9 | 1 |
| | (2) scratch resistance (surface gloss retentiveness, %) | | 90 | 89 | 87 | 80 | 71 | 59 |
| | (3) outward appearance | | ○ | ○ | ○ | Δ | ○ | ○ |
| | (4) recoating adhesiveness | | 10 | 10 | 10 | 4 | 8 | 10 |
| | (5) accelerated weather resistance | | ○ | ○ | ○ | Δ○ | Δ○ | Δ○ |
| | (6) pencil hardness | | 2H | H | 2H | HB | F | HB |

TABLE 15-continued

|  |  | Comparative Example | | | | | |
|---|---|---|---|---|---|---|---|
|  |  | 2-1 | 2-2 | 2-3 | 2-4 | 2-5 | 2-6 |
|  | (7) stain resistance (ΔL) | 6.7 | 6.8 | 7.0 | 2.3 | 1.8 | 7.6 |
|  | (8) hydrophilicity (before exposure/after exposure)(*) | 84/76 | 80/77 | 83/75 | 77/42 | 86/72 | 90/76 |
| Molar Ratio (epoxy groups/carboxyl groups) | | 1.56 | 1.25 | 0.90 | — | 1.29 | — |

From the test data in Table 14 and Table 15, it is known that the coating films obtained in Examples 2-1 to 2-10 all had well-balanced physical properties, including excellent acid resistance, scratch resistance, weather resistance and recoating adhesiveness, and additionally had excellent stain resistance.

TABLE 16

|  |  | Example | | | | | | | | | |
|---|---|---|---|---|---|---|---|---|---|---|---|
|  |  | 3-1 | 3-2 | 3-3 | 3-4 | 3-5 | 3-6 | 3-7 | 3-8 | 3-9 | 3-10 |
| Component (A) | Resin 2 (Production Example 3) | 70 | 65 | — | — | — | — | — | 70 | 70 | — |
|  | Resin 2 (Production Example 4) | — | — | 80 | — | — | — | — | — | — | 80 |
|  | Resin 2 (Production Example 5) | — | — | — | 70 | — | — | — | — | — | — |
|  | Resin 1 (Production Example 6) | — | — | — | — | 60 | — | 40 | — | — | — |
|  | Resin 1 (Production Example 7) | — | — | — | — | — | 80 | — | — | — | — |
|  | OH-having resin (Production Example 8) | — | — | — | — | — | — | 25 | — | — | — |
| Component (B) | B-1 (Production Example 9) | 30 | — | 20 | 30 | 40 | — | 35 | 30 | 30 | 20 |
|  | B-2 (Production Example 9) | — | 35 | — | — | — | — | — | — | — | — |
|  | B-3 (Production Example 9) | — | — | — | — | — | 20 | — | — | — | — |
| Component (C) | HAS-1 | 20 | 10 | — | 30 | 5 | 20 | 20 | — | 10 | — |
|  | MS56S | — | — | — | — | — | — | — | — | — | 10 |
|  | ESi40 | — | — | 10 | — | — | — | — | — | — | — |
|  | MSi51 | 10 | 5 | 10 | — | 5 | — | 20 | — | — | — |
|  | AFP-1 | — | — | — | — | — | — | — | — | 10 | — |
| Component (F2) | tetrabutyl-ammonium chloride | 0.3 | — | — | — | — | 0.3 | 0.3 | 0.3 | 0.3 | — |
| (9) thermal curability (gel fraction)*(%) | | 96.5 | 97.0 | 95.0 | 96.0 | 96.5 | 98.0 | 97.5 | 97.0 | 96.0 | 96.0 |
| (1)-2 acid resistance | | 10 | 10 | 9 | 10 | 10 | 10 | 10 | 10 | 10 | 9 |
| (2) scratch resistance (surface gloss retentiveness)(%) | | 72 | 70 | 69 | 71 | 73 | 74 | 73 | 73 | 70 | 70 |
| (3) outward appearance | | ○ | ○ | ○ | ○ | ○ | ○ | ○ | ○ | ○ | ○ |
| (10) hot water resistance | | ○ | ○ | ○ | ○ | ○ | ○ | ○ | ○ | ○ | ○ |
| (4) recoating adhesiveness | | 10 | 10 | 10 | 10 | 10 | 10 | 10 | 10 | 10 | 10 |
| (8) contact angle(*) | | 46 | 52 | 54 | 50 | 58 | 50 | 48 | 60 | 48 | 46 |
| (7) stain resistance (ΔL) | | -2.0 | -2.5 | -2.4 | -1.9 | -2.6 | -2.1 | -1.9 | -3.5 | -2.2 | -1.7 |
| Molar Ratio (epoxy group/carboxyl groups) | | 1.33 | 1.08 | 1.42 | 1.16 | 1.18 | 0.79 | 0.90 | 1.33 | 1.33 | 1.42 |

(*) Gel Fraction: in samples baked at 140° C.

TABLE 17

| | | Comparative Example | | | |
|---|---|---|---|---|---|
| | | 3-1 | 3-2 | 3-3 | 3-4 |
| Component (A) | Resin 2 (Production Example 3) | 65 | — | — | — |
| | Resin 2 (Production Example 4) | — | 65 | — | — |
| | Resin 2 (Production Example 5) | — | — | — | — |
| | Resin 1 (Production Example 6) | — | — | — | — |
| | Resin 1 (Production Example 7) | — | — | — | — |
| | OH-having resin (Production Example 8) | — | — | — | — |
| | Compara. Component 1 (Compara. Production Example 1) | — | — | 65 | — |
| | Compara. Component 2 (Compara. Production Example 2) | — | — | — | 65 |
| Component (B) | B-1 (Production Example 9) | — | — | 35 | 35 |
| | B-2 (Production Example 9) | 35 | — | — | — |
| | B-3 (Production Example 9) | — | — | — | — |
| | B'(Compara. Production Example 3) | — | 35 | — | — |
| Component (C) | HAS-1 | 100 | 10 | — | — |
| | ESi40 | — | — | — | — |
| | MSi51 | — | 10 | — | — |
| Component (F2) | tetrabutyl-ammonium chloride | — | — | — | — |
| (9) thermal curability (gel fraction)*(%) | | 95.5 | 94.0 | 95.5 | 89.0 |
| (1)-2 acid resistance | | 10 | 10 | 10 | 5 |
| (2) scratch resistance (surface gloss retentiveness)(%) | | 60 | 54 | 71 | 46 |
| (3) outward appearance | | Δ | ○ | ○ | ○ |
| (10) hot water resistance | | ○ | ○ | ○ | Δ |
| (4) recoating adhesiveness | | 10 | 3 | 10 | 10 |
| (8) contact angle (°) | | 44 | 54 | 80 | 60 |
| (7) stain resistance (ΔL) | | -2.0 | -2.4 | -8.2 | -8.6 |
| Molar Ratio (epoxy groups/carboxyl groups) | | 1.33 | 1.56 | 1.33 | 1.33 |

(*) Gel Fraction: in samples baked at 140° C.

From the test data in Table 16 and Table 17, it is known that the coating films obtained in Examples 3-1 to 3-10 all had excellent acid resistance and scratch resistance, and additionally had excellent stain resistance.

TABLE 18

| | | Example | 4-1 | 4-2 | 4-3 | 4-4 |
|---|---|---|---|---|---|---|
| Composition (parts) | Component (A) | A-1 | 70 | 70 | — | — |
| | | A-4 | — | — | 80 | 80 |
| | Component (B) | B-1 | — | — | 20 | 20 |
| | | B-2 | 30 | 30 | — | — |
| | Component (C) | MS56S | 5 | 5 | 10 | 10 |
| | Component (F1) | Colonate 2359 | — | 4 | — | — |
| | | Desmodur BL3175 | — | — | — | 8 |
| Evaluation | (1)-1 | acid resistance | 10 | 10 | 10 | 10 |
| | (2) | scratch resistance (%) | 91 | 92 | 91 | 91 |
| | (3) | outward appearance | ○ | ○ | ○ | ○ |
| | (5) | accelerated weather resistance | ○ | ○ | ○ | ○ |
| | (6) | pencil hardness | 2 H | 2 H | H | H |
| | (7) | stain resistance (ΔL) | 1.1 | 1.2 | 1.3 | 1.2 |
| | (11) | hot water-resistant adhesiveness (before dipped in hot water) | 10 | 10 | 10 | 10 |
| | (11) | hot water-resistant adhesiveness (after dipped in hot water) | 8 | 10 | 10 | 10 |
| Molar Ratio (epoxy groups/carboxyl groups) | | | 1.56 | 1.56 | 2.0 | 2.0 |

From the test data in Table 18, it is known that adding the component (Fl) of blocked isocyanate to the coating compositions could improve the hot water resistance of the coating films of the compositions.

Industrial Applicability

As mentioned hereinabove, the curable composition for top coating of the present invention has good thermal curability, and the coating films from the composition have excellent and well-balanced physical properties including excellent acid resistance, scratch resistance, weather resistance, appearance and recoating adhesiveness, and additionally have extremely excellent stain resistance. Therefore, the composition is favorable to top coating, for example, for cars, industrial machines, steel furniture, interior and exterior decorations for constructions, household electric appliances, plastic goods, etc., especially for car bodies.

What is claimed is:

1. A curable composition for top coating, which comprises;

(A) 100 parts by weight of a resin having an epoxy group, (B) from 0.001 to 100 parts by weight of an oligomer compound having a molecular weight of not larger than 2,000, which is prepared by reacting a polyol compound and an acid anhydride in a half-esterification reaction, and that has at least 2 carboxyl groups in one molecule, (C) from 1.0 to 100 parts by weight of a silicon compound of the following general formula (I) and/or its partially-hydrolyzed condensate:

$$(R^1O)_{4-a}SiR^2_a \qquad (I)$$

and (D) a resin having a hydroxyl group, with no hydrolyzable silyl group, in an amount of from 0.001 to 80 parts by weight relative to 100 parts by weight of the total solid content of the components (A), (B) and (C);

wherein (D) is a non-aqueous dispersed polymer obtained by copolymerizing monomers that comprise at least one vinylic monomer, and wherein, $R^1$ represents a hydrogen atom, an alkyl group having from 1 to 10 carbon atoms, an aryl group having from 6 to 10 carbon atoms, or an aralkyl group having from 7 to 10 carbon atoms; $R^2$ represents an alkyl group having from 1 to 10 carbon atoms, an aryl group having from 6 to 10 carbon atoms, an aralkyl group having from 7 to 10 carbon atoms, or an alkoxy group having from 1 to 10 carbon atoms; a represents an integer of from 0 to 2; and plural $R^1$'s may be the same or different, and plural $R^2$'s, if any, may be the same or different.

2. The curable composition for top coating of claim 1, wherein the component (A) is a resin having at least 2 epoxy groups in one molecule and having an epoxy equivalent of from 240 to 2,000 g/mol.

3. The curable composition for top coating of claim 1 or 2, wherein the component (A) is a vinylic copolymer, of which the main chain is substantially a vinylic copolymer chain, and which has at least 2 epoxy groups in one molecule and has at least one hydrolyzable silyl group of the following general formula (II) as bonded to the carbon atom at the main chain terminals and/or in the side chains in the molecule, and which has an epoxy equivalent of from 240 to 2,000 g/mol and a hydrolyzable silyl equivalent of from 500 to 7,000 g/mol:

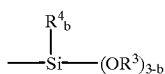

(II)

wherein $R^3$ represents a hydrogen atom, or an alkyl group having from 1 to 10 carbon atoms; $R^4$ represents a hydrogen atom, or a monovalent hydrocarbon residue selected from an alkyl group having from 1 to 10 carbon atoms, an aryl group having from 6 to 10 carbon atoms and an aralkyl group having from 7 to 10 carbon atoms; b represents an integer of from 0 to 2; and plural $R^3$'s may be the same or different, and plural $R^4$'s, if any, may be the same or different.

4. The curable composition for top coating of claim 3, wherein the vinylic copolymer of the component (A) additionally has at least one alcoholic hydroxyl group at the main chain terminals and/or in the side chains, and has an alcoholic hydroxyl equivalent of from 500 to 3,000 g/mol.

5. The curable composition for top coating of claim 1 or 2, wherein the component (A) additionally has a monovalent organic group of a polyoxyalkylene group of a general formula (III):

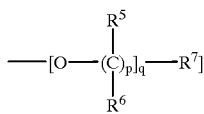

(III)

wherein $R^5$ and $R^6$ may be the same or different, and each represents a hydrogen atom or an alkoxy group having from 1 to 4 carbon atoms; $R^7$ represents a hydrogen atom, or an alkoxy group having from 1 to 4 carbon atoms; p represents an integer of from 2 to 4; and q represents an integer of from 1 to 200.

6. The curable composition for top coating of claim 1 or 2, wherein the molar ratio of the epoxy groups of component (A) to the carboxyl groups of component (B) ranges from 0.2/1 to 3.0/1.

7. The curable composition for top coating of claim 1 or 2, wherein the component (C) is a partially-hydrolyzed condensate of tetraalkyl silicates.

8. The curable composition for top coating of claim 1 or 2, wherein the component (C) is a partially-hydrolyzed condensate of tetramethyl silicate and/or tetraethyl silicate, and has a weight-average molecular weight of not smaller than 1,000.

9. The curable composition for top coating of claim 1 or 2, wherein the component (D) is a copolymer of a vinylic monomer having a hydroxyl group, and any other vinylic monomers.

10. The curable composition for top coating of claim 1 or 2, wherein the process of copolymerizing monomers to produce component (D) comprises dispersion polymerization of said copolymers by reacting at least one vinylic monomer having a hydroxyl group, with at least one vinylic monomer having no hydroxyl group, in an organic solution that contains an organic solvent-soluble polymer, to produce a non-aqueous dispersed polymer having a number-average molecular weight of from 1,000 to 25,000, and that is insoluble in said organic solution; and wherein said organic solvent-soluble polymer is comprised of from 5 to 30 parts by weight of at least one vinylic monomer having a hydroxyl group, and from 70 to 95 parts be weight of at least one vinylic monomer having no hydroxyl group.

11. The curable composition for top coating of claim 1 or 2, further comprising an amino resin (E), in an amount of not larger than 5 parts by weight relative to 100 parts by weight of the total solid content of the components (A), (B) and (C).

12. A coated article having a clear top coat as formed over a surface of a substrate previously coated with a coating composition that contains metallic powder and/or color pigment, in which said clear top coat consists essentially of the curable composition for top coating of claim 1 or 2.

* * * * *